Sept. 14, 1965 J. L. MENNITT 3,206,296
GLASS MOLDING APPARATUS
Original Filed May 7, 1958 16 Sheets-Sheet 1

INVENTOR.
JOSEPH L. MENNITT
BY J. R. Nelson
and D. T. Ennis
ATTORNEYS

Sept. 14, 1965 J. L. MENNITT 3,206,296
GLASS MOLDING APPARATUS
Original Filed May 7, 1958 16 Sheets-Sheet 2

INVENTOR.
JOSEPH L. MENNITT
BY
ATTORNEYS

Sept. 14, 1965   J. L. MENNITT   3,206,296
GLASS MOLDING APPARATUS
Original Filed May 7, 1958   16 Sheets-Sheet 4

INVENTOR.
JOSEPH L. MENNITT
BY
ATTORNEYS

Sept. 14, 1965

J. L. MENNITT 3,206,296

GLASS MOLDING APPARATUS

Original Filed May 7, 1958

INVENTOR.
JOSEPH L. MENNITT
BY J. R. Nelson
and D. T. Innis
ATTORNEYS

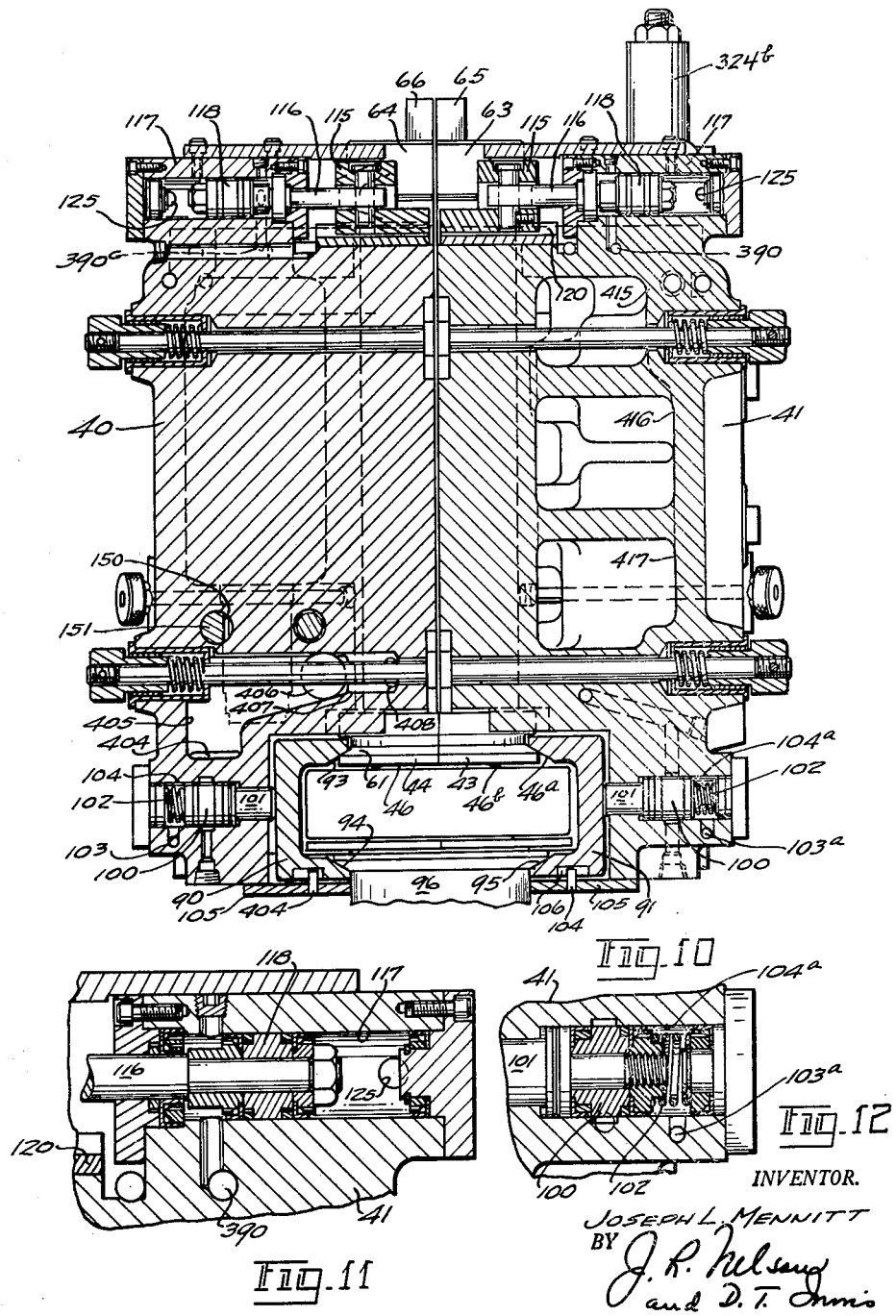

INVENTOR.
JOSEPH L. MENNITT
BY J. R. Nelson
and D. T. Innis
ATTORNEYS

Sept. 14, 1965  J. L. MENNITT  3,206,296
GLASS MOLDING APPARATUS
Original Filed May 7, 1958  16 Sheets-Sheet 10
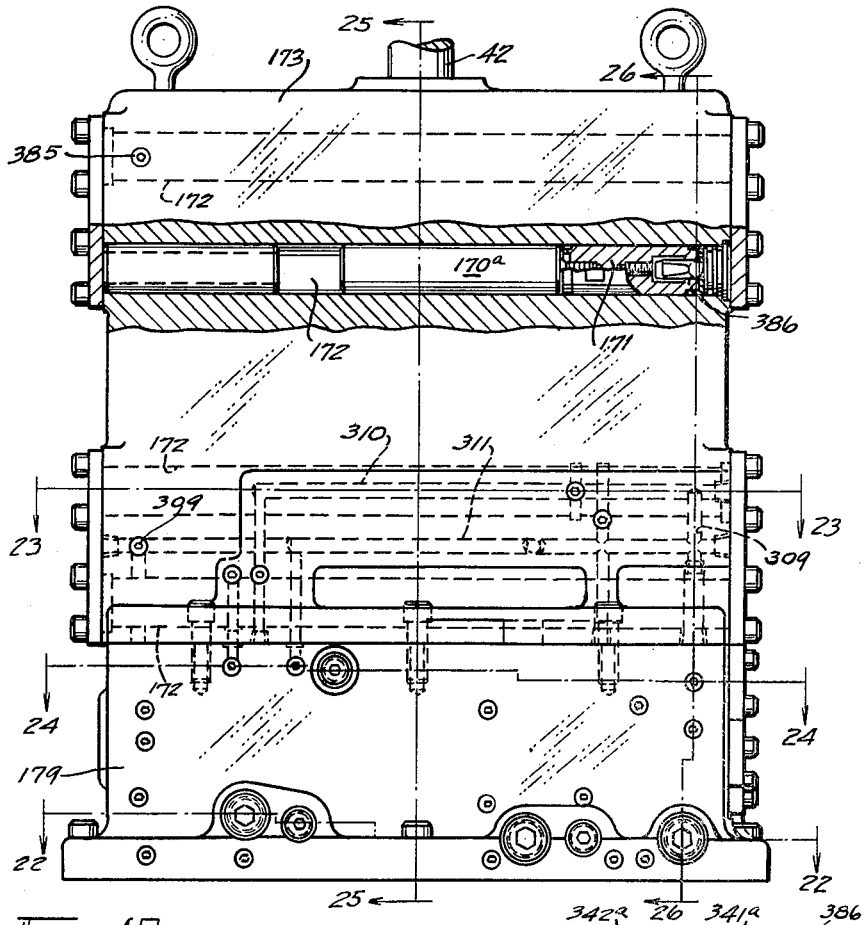
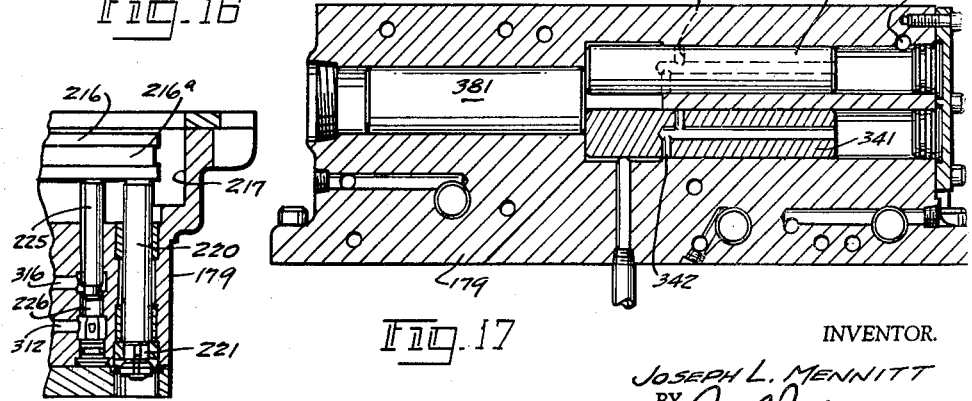
INVENTOR.
JOSEPH L. MENNITT
BY
ATTORNEYS

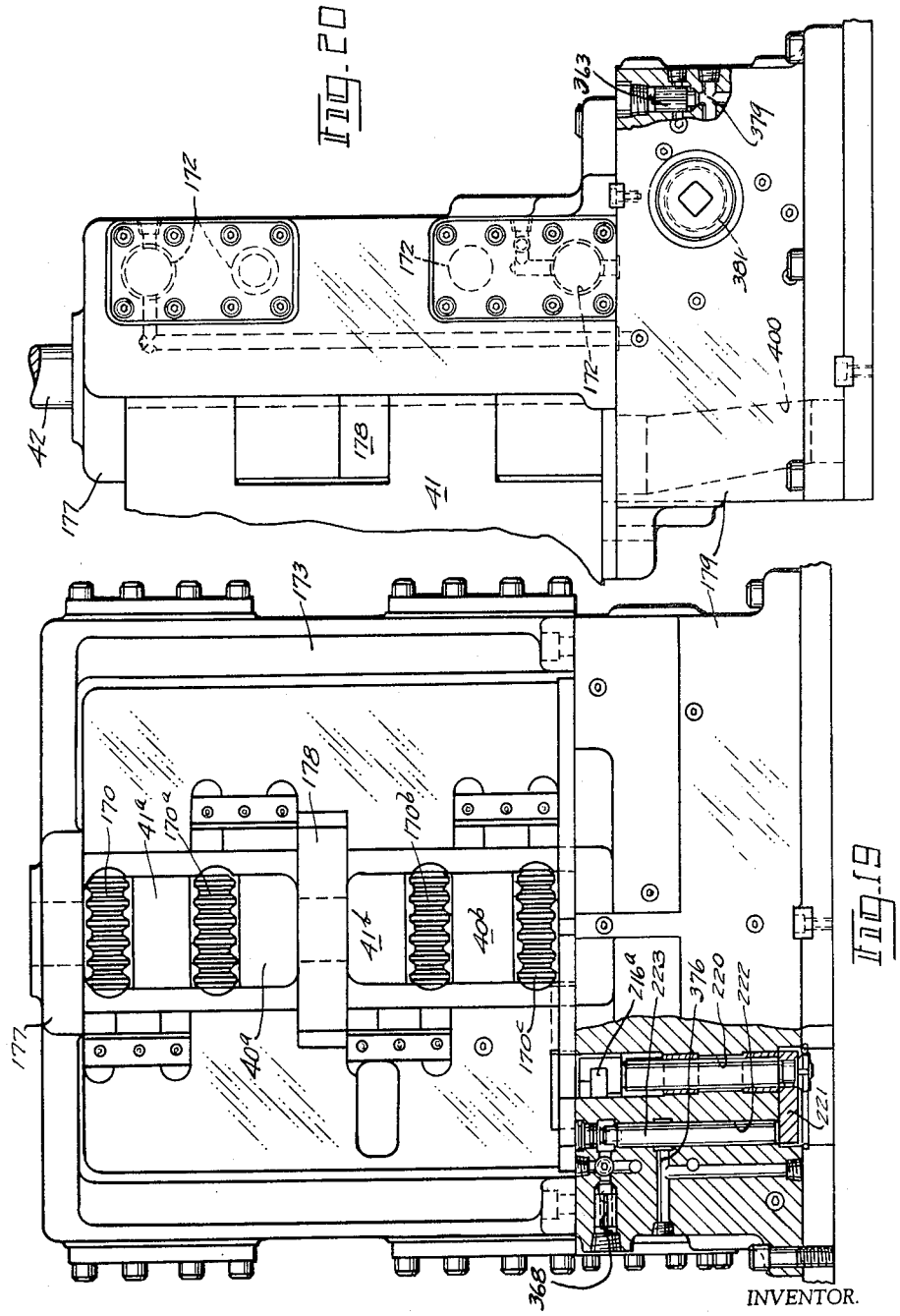

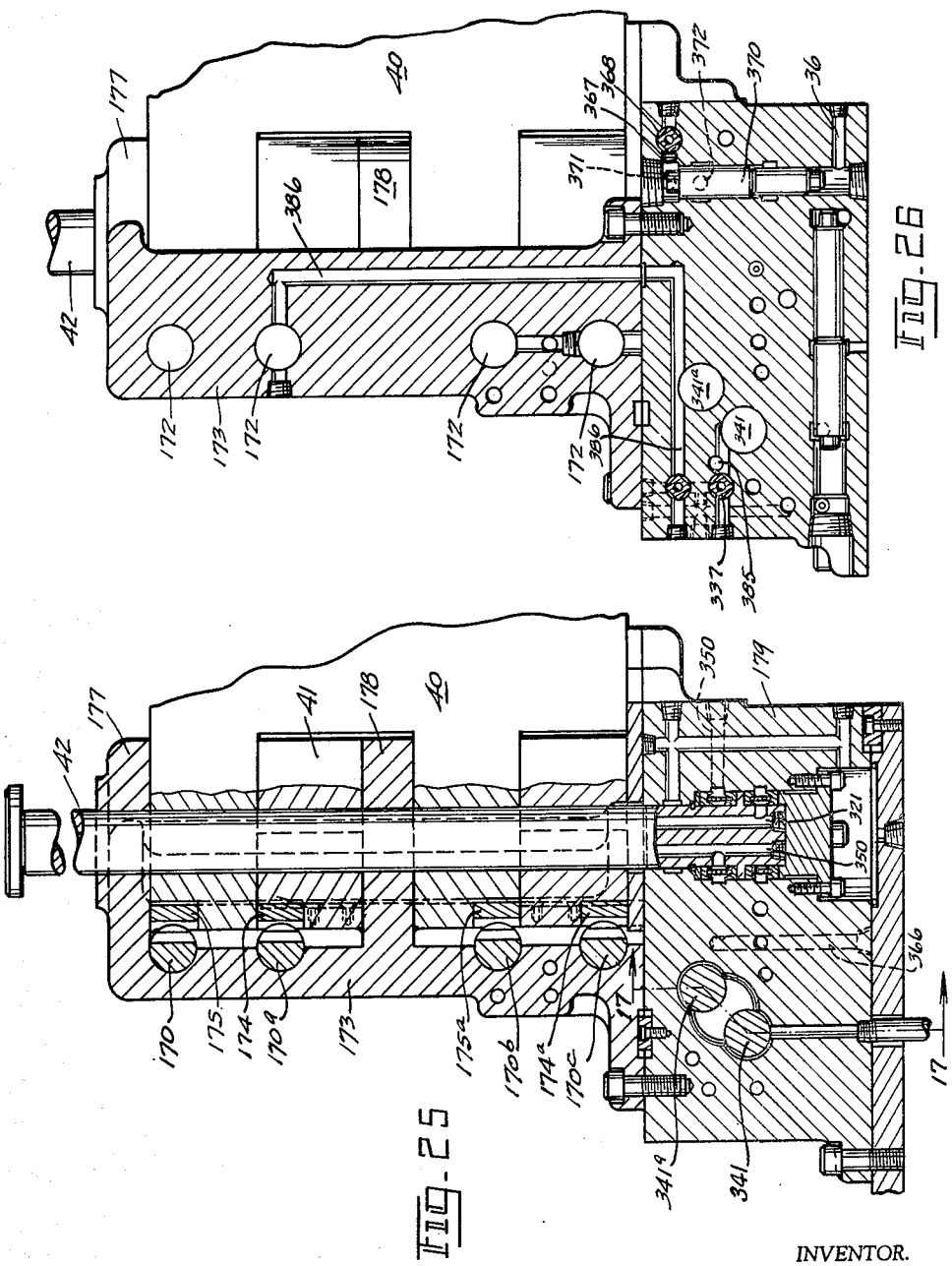

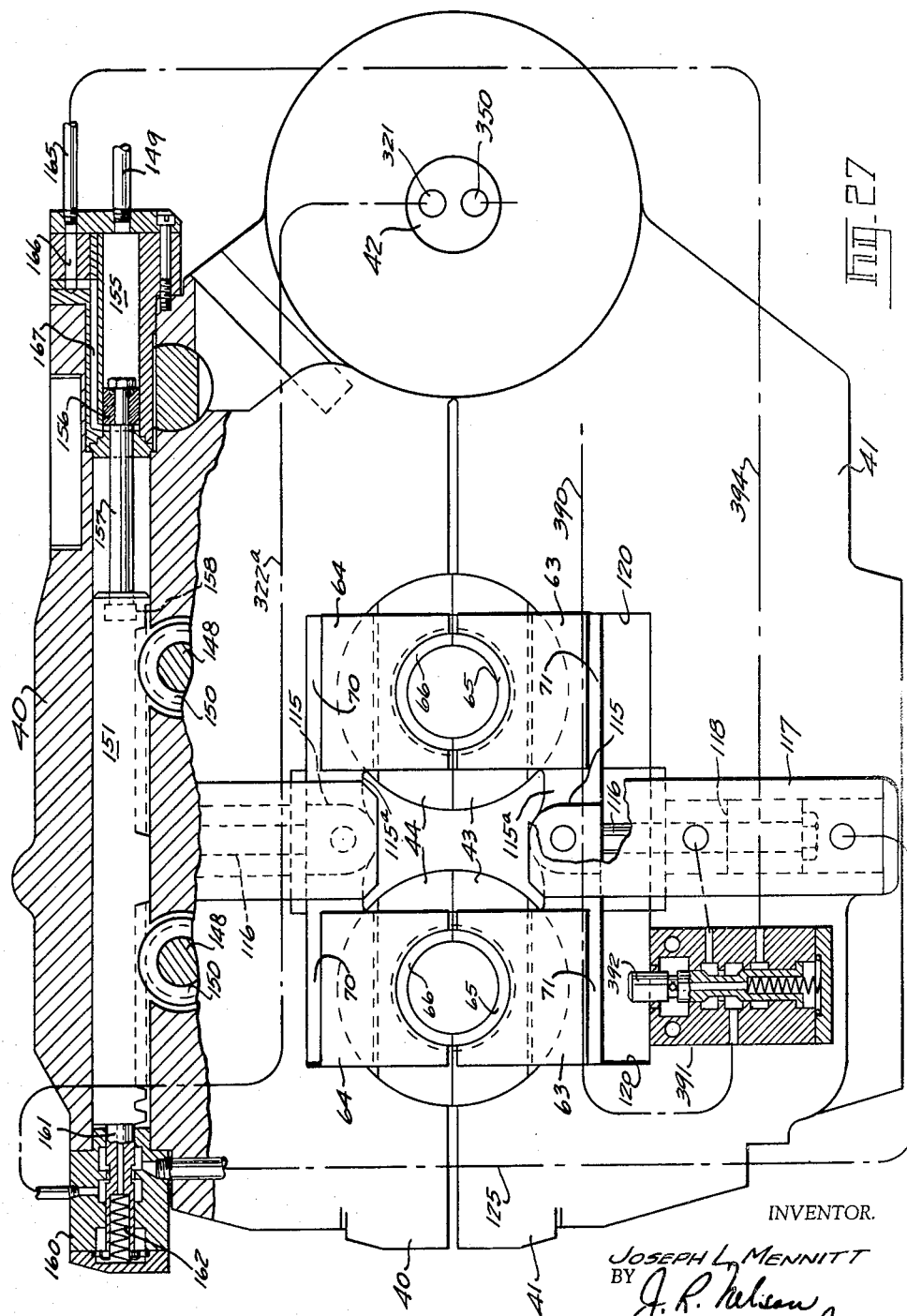

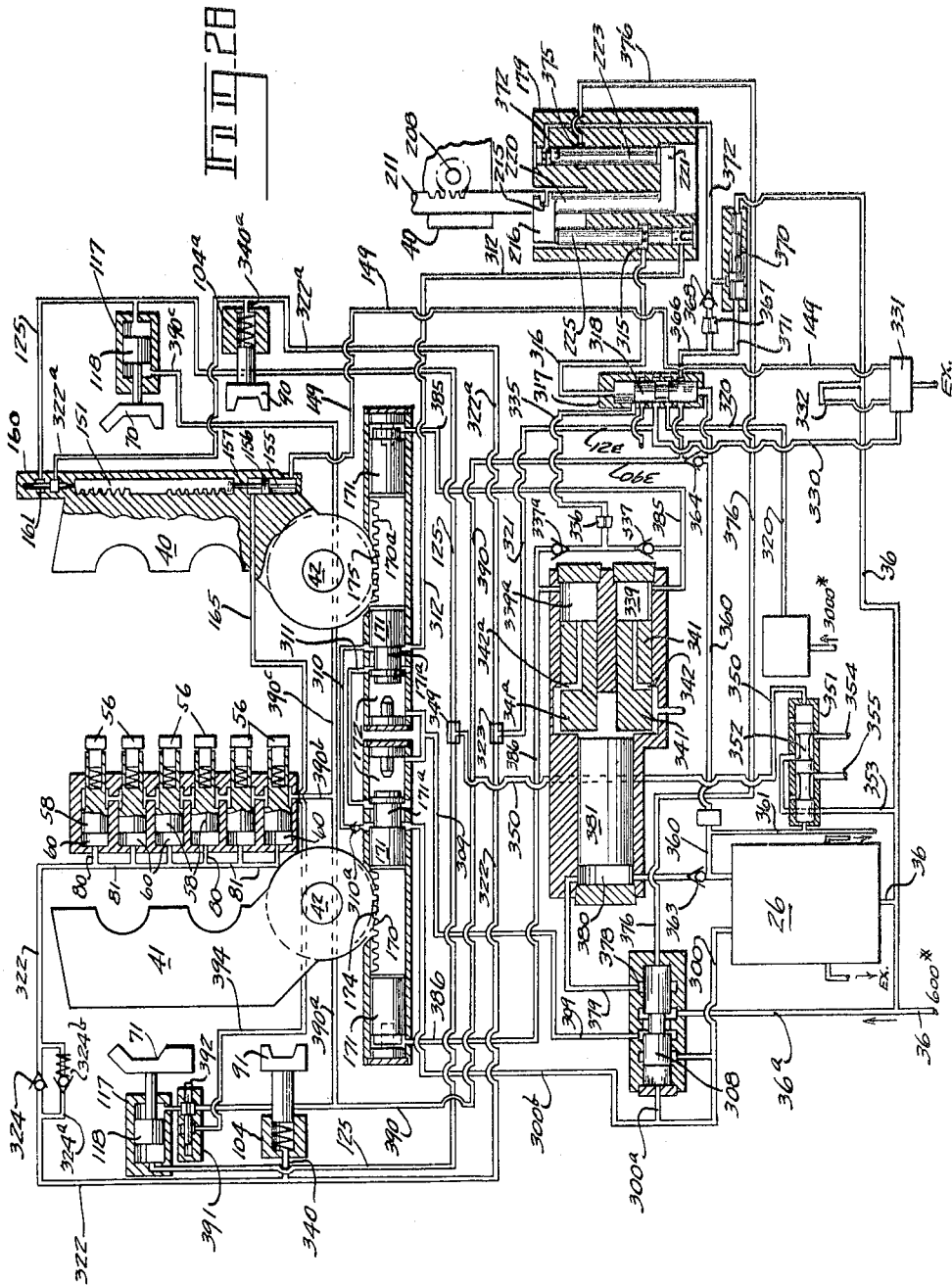

United States Patent Office 3,206,296
Patented Sept. 14, 1965

3,206,296
GLASS MOLDING APPARATUS
Joseph L. Mennitt, Toledo, Ohio, assignor to Owens-Illinois Glass Company, a corporation of Ohio
Continuation of application Ser. No. 64,096, Oct. 21, 1960, which is a continuation of application Ser. No. 733,533, May 7, 1958. This application Jan. 15, 1964, Ser. No. 339,841
11 Claims. (Cl. 65—357)

The present application is a continuation of my copending application, Serial No. 64,096, filed October 21, 1960, now abandoned, the latter being a continuation of an earlier application Serial No. 733,533, filed May 7, 1958, now abandoned.

My invention relates to a glass molding apparatus for producing hollow glass articles, such as glass containers or jars. Particularly the invention relates to such an apparatus for use in the manufacture of containers by a press and blow method regardless of whether these containers be of a size in the narrow neck or wide mouth classification of ware.

The essence of this invention is applicable equally to either the press and blow method or the blow and blow method of making containers.

In the usual press and blow and blow and blow machines the various mechanisms for operating the blank molds and blow molds as well as the mechanisms which cooperate with the blank mold, such as baffles, blowheads, etc., are carried separately and independently of the blank and/or blow mold arms. This is particularly true of the blank or parison forming units of these machines.

As a consequence of this, the time of the opening and closing movements of the mold arms, the movement of the various cooperating blow-heads, baffles, etc. must be coordinated with respect to each other and in most instances these movements must be overlapped in order to save time intervals and thereby reduce the total operating or forming cycle.

Such timing, of course, then becomes an intricate system and beyond this, it also supplies certain detrimental features. For example, a baffle plate operating in conjunction with a blank forming mold when brought into contact with such a mold is, of course, under pneumatic pressure and because of this pressure, provides a tendency for the molds to shift in one direction or another. Of course, any such shifting thereby provides a movement as between the blank mold cavities and the neck mold cavities resulting in certain detrimental features being applied to the glass such as checks, crizzles, etc.

These same remarks as to the detrimental features of the normal blow and blow processes are also true in the press and blow field of molding.

On prior machines, the mold components are mounted on members individually pivoted or otherwise attached to the glass machine frame and the members manipulated so that the components cooperate in the forming cycle to form a charge of glass to a molded shape. In so doing these members and components apply equal and opposite reaction forces to the machine frame and after the locking devices are of the reaction or opposing force variety. In pressing glass by a modern machine, high-speed cycle, these forces become extremely great and often concentrated at one or more points of the apparatus, so that the molding unit by necessity has been heretofore constructed as a heavy and cumbersome mechanism. As such, the parts or components of the apparatus may shift; one with respect to the other, and self-alignment during operation may be virtually impossible.

It is the concept of this present invention that the arms, provided for carrying the molding cavity inserts of a blank mold, for example, are adapted for certain limited oscillatory movement about the pivotal mounting, about which these arms open and close in order to permit the blank cavities to thus seek a registering position with respect to the cooperating neck mold and become perfectly aligned therewith.

In addition to the above, these mold arms are also provided with an arm locking system carried thereon and movable therewith so that in the application of the closing or locking pressures, the mold arms will be locked together with respect to each other and the force applied for so doing will be concentrated on the mold arms rather than between the mold arms and some separate stationary point.

There is also supplied and carried on these mold arms pressure applying means which are specifically adapted to apply pressure to at least one-half of the molding cavity inserts to thereby force the two mating halves of the inserts to be held in tightly closed relation to each other as well as in aligned relation, such holding or closing pressure being applied totally on and within the arm and against the mold arm locking pressure.

Also carried on these arms is a mechanism for moving a mold cavity baffle plate or closing member into and out of cavity closing position, the movement of this baffle being coordinated with a gob guiding member also carried on the mold arms. The apparatus for locking and releasing the mold cavity baffle plate in operative position is also carried on and with the mold arms.

In this manner the actual blank mold arms become a complete molding unit, so arranged and constructed that its various components may be brought into perfect alignment with each other. In addition, this blank molding unit may also shift or move as a unit about the mold arm fulcrum to seek perfect alignment with the pressing plunger or other blank or parison forming tools.

With respect to the operation of the mold arms per se, that is, their opening and closing movements, these mechanisms are also so mounted as to form an integral part of each mold arm unit and are specific to each unit so far as the opening and closing motions of the mold arms may be concerned.

With most of this cooperating apparatus mounted directly upon the blank mold arms, it should be quite obvious that the interrelated motion of the mechanisms may be carried out with extreme rapidity and in almost any desired sequence and that any such sequence need not necessarily wait for the complete closing and/or opening of the molds before being actuated.

It is one of the objects of the present invention to provide an assembly of several mold components including the mold arms, mold halves, gob guides, baffles, neck molds and pressing plungers, associated so as to form in effect a self-contained unit when they are closed and locked together and independent of connection with the machine, such as the frame thereof, other than of course for support of the assembly in place, so that when locked the several pressures applied to these components at the several points to lock the mold halves, to lock the neck molds, to lock the baffles, to lock the mold arms and to press the glass, are self-contained, i.e. they are so contained within the unit that none of the several locked mold components can be moved with respect to each other.

Also provided is ability for the complete molding unit to align with the plunger or other forming tools in operation.

This present invention is applicable to almost any form of split mold, i.e., either a blank or a blow mold, in either a blow and blow or a press and blow operation or process and in the production of either narrow neck, semi-wide mouth or wide mouth ware.

For the purpose of presenting a preferred embodiment of the invention, this present disclosure illustrates the press and blow production of narrow neck ware and with such production being of the dual mold type. Specifically, this invention relates to the multiple production of glass parisons by the press and blow method and in particular to the particular mold structure for so doing.

Normally narrow neck ware is produced by the blow and blow method by and through the forming of a parison in an inverted mold. Such method requires positioning a gob guide over the open end of an inverted parison mold, charging the mold through said gob guide and the open top of the mold, removing the gob guide, positioning a blowhead over the mold opening to apply air pressure to the top of the glass for forming the neck end of the container or parison therefor. Next the blow head is replaced by a baffle, air is admitted through the neck of the parison, and the glass is expanded to the confines of the parison mold. The baffle is lifted, the parison mold is opened, and the parison transferred to a blow mold for final expansion.

The above described gob guide, blowhead and baffle are separately mounted distinct items or pieces of apparatus arranged to be moved to and from position in contact with the mold per se. These mechanisms are pressure operated and because of being mounted separately from the mold, they must inherently apply a distorting pressure as between their base of mounting and the mold. Thus, with every contact as between either the gob guide, the baffle or the blowhead, the mold is disturbed from its normal position. This in turn acts disadvantageously upon the parison in the form of causing crizzles, checks, etc. These detrimental results occur mainly because these pressure devices have a rigid base support, separate from the mold, and its own support, with the result that the molds move with respect to each other. Consequently, it is an object of this present invention to obviate this last mentioned condition by providing a structure wherein the various accessories, such as the gob guide, baffle, etc., are locked directly to the mold and the mold is locked directly to its own support and in such manner that there can be no movement of one mold part relative to another.

A further object is to provide an organization of mechanical elements of a design which will provide such coordination as between movements thereof that the total overall forming cycle may be reduced to a minimum.

Another object of the invention resides in the provision of a glass molding apparatus on a glass forming machine wherein the plural components of the molding apparatus are manipulated and brought into cooperating position and locked such that the components and their locking devices collectively constitute a composite or self-contained, integral glass forming unit.

Other objects will be apparent from the drawings and the following descriptive material.

In the drawings:

FIG. 10 is a sectional elevation taken at line 10—10 on FIG. 9, illustrating the actuating cylinders for the combination gob guide and baffle locking and shifting mechanism;

FIG. 11 is an enlarged sectional view of actuating cylinders for locking the gob guides to the parison mold inserts;

FIG. 12 is an enlarged sectional view of the clamps for locking the neck molds to the parison mold inserts;

FIG. 16 is an elevation of the rear of the mold arm support bracket illustrating the location and structure of the several mold arm actuating pistons and racks;

FIG. 17 is a sectional view taken at line 17—17 on FIG. 25 and illustrates the mold arm opening equalizer;

FIG. 18 is a sectional elevation taken at line 18—18 on FIG. 21 and illustrates the structure for locking and unlocking the parison mold arms;

FIG. 19 is a part sectional elevation taken at line 19—19 on FIG. 21 illustrating the mold arm operating racks and the mold arm lock mechanism;

FIG. 20 is a side elevation of the mold arm support bracket further illustrating the location of the mold arm racks and the mold arm equalizing piston;

FIG. 25 is a sectional elevation taken at line 25—25 on FIG. 16 illustrating the mold arm rack and sector devices;

FIG. 26 is a sectional elevation taken at line 26—26 on FIG. 16 illustrating the mold arm opening and closing cylinders and fluid connections thereto;

FIG. 27 is a part sectional plan view of the mold arms illustrating the baffle and gob guide mechanisms; and FIG. 28 is a schematic view of the fluid system for operating the various mechanisms essential to this present invention.

Figure 1:
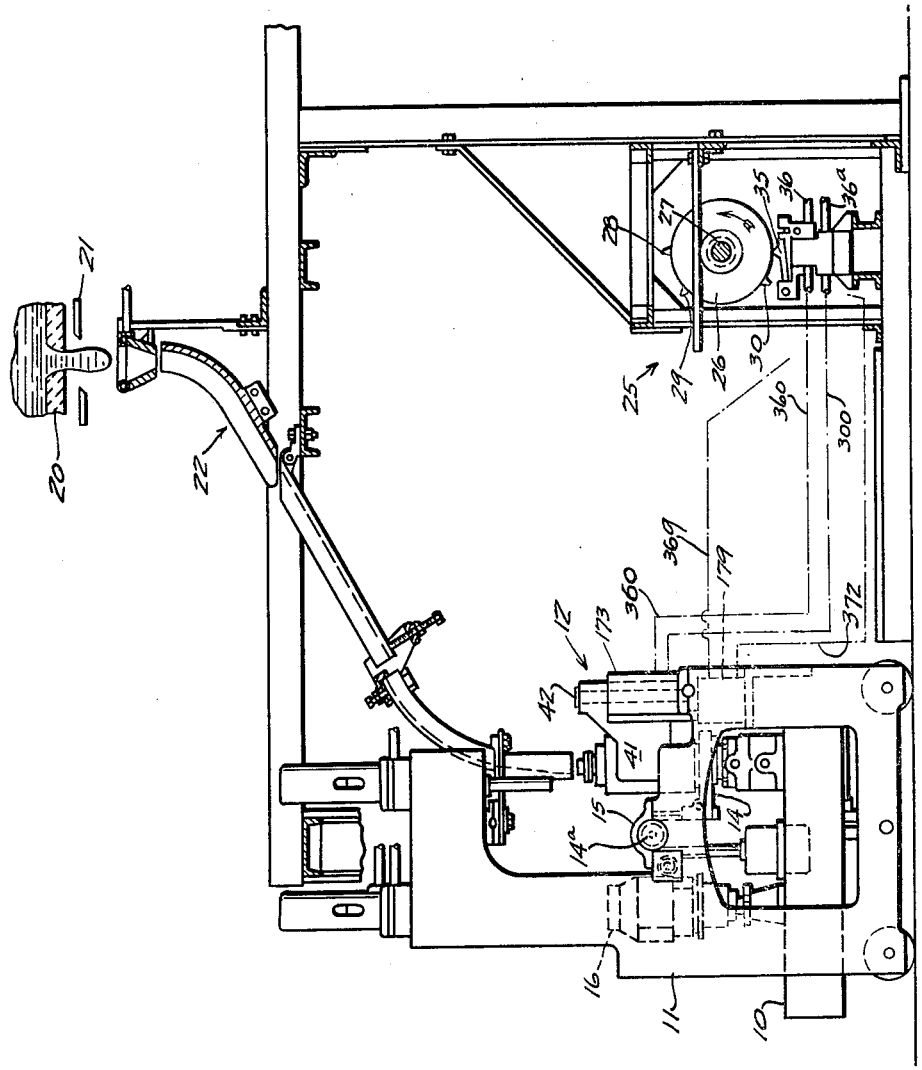
FIG. 1 is an elevational view of a forming machine and glass feeder of the usual well known type to which this present invention is applicable.

Referring to the drawings and in particular to FIG. 1, there is disclosed a container forming machine visually similar in some of its structural aspects to the well-known "I.S." glass container forming machine. This machine is comprised of a base 10 having mounted thereon a frame 11. Supported on the frame 11 is a blank or parison molding unit 12, including a parison transfer mechanism 14 fulcrumed as at 15 for transferring a parison from its inverted forming position to an upright position to be encompassed by a blowing mold 16.

A feeder 20 of the usual well-known commercial type is adapted to feed charges of molten glass through severing a suspended gob by means of shears 21, discharging same into a gob-guiding trough mechanism 22 which is arranged to guide the individual charges into the open upper ends of the blank or parison cavities in the forming unit 12.

A master timing mechanism 25 is comprised of an elongated cam drum 26 mounted for rotation about the axis of shaft 27 with said drum carrying a series of actuating knobs 28, 29 and 30 spaced along its length and around its circumference. This timing mechanism is also well-known in the industry and is in common use in connection with the well-known "I.S." machines. A series of valves 35 cooperate with said drum knobs 28–30 and are adapted to permit fluid under pressure to pass from lines 36 and 36a through other conduits or lines to the blank or parison molding or forming unit 12.

The drawings herein illustrate a multiple cavity mechanism and it will be noted that in most instances the mechanisms for each parison mold are identical both in design and operational features. Consequently, the descriptive material wherever possible will be limited to the structure of a single unit or mechanism.

Each blank or parison forming unit 12 is comprised of a pair of mold supporting arms or members 40 and 41 fulcrumed on a common pivot 42 and mounted on each mold support arm are pairs of parison mold inserts 43 and 44, which are formed in mating halves so that when they are brought to closed position, the two halves will thereby form between them a pair of molding cavities 45. These mold inserts are retained in the mold arms by means of the top and bottom clips 47 and the center clips 48. These clips are so designed that the inserts will have a certain amount of freedom of movement both rotatively and vertically with respect to the mold support arms. The vertical position of these mold inserts 43 and 44 is maintained by the contact between the notched surface 46c, formed at the bottom end of each insert, and the top surface 46e of the neck mold locks 90 and 91 (see FIG. 13). When the mold members as inserts 43 and 44 move to closed position surface 46 slides upon surface 46b (FIGS. 2 and 13) and causes the members or inserts to be brought into alignment vertically with respect to each other and with respect to the neck molds 88. This freedom of movement of these inserts is for the purpose of permitting the mold insert halves to become properly aligned with respect to each other and with respect to the other cooperating molding elements.

The mold inserts 44, for example, are carried on the mold arm or support member 40 and are arranged for contact with locating blocks 50 and 51, attached to the mold arm 40 and equally spaced diametrically for locating contact. These locating blocks 50 and 51 may either extend through the entire height of the mold support and insert member 44 or there may be several such blocks positioned along the height of the insert member 44.

In the opposite mold support 41 a plurality of pressure applying piston plugs 56 are provided which are located 90° off of the radial center line or mold seam through the split of the cavity inserts 43 and 44. The aforementioned insert member locating blocks 50 and 51 (FIGS. 4 and 5) are each spaced equally 45° off of the radial split line of the mold inserts in order to provide a condition whereby, when locking pressure is applied to the plugs 56, the mold members 44 will be forced equally against the locating blocks 50 and 51, thereby centering the forming cavity 45 with respect to the radial center line through the two mold supporting arms 40 and 41.

The locking members for locking the mold members 43 and 44 to each other and to the mold arms are each comprised of a contact plug 56 having an extending stem 57 slidably mounted in a piston 58 and provided with a spring 59 adapted to maintain the plug 56 in contact with the wall of the mold insert member 43.

Figure 13:
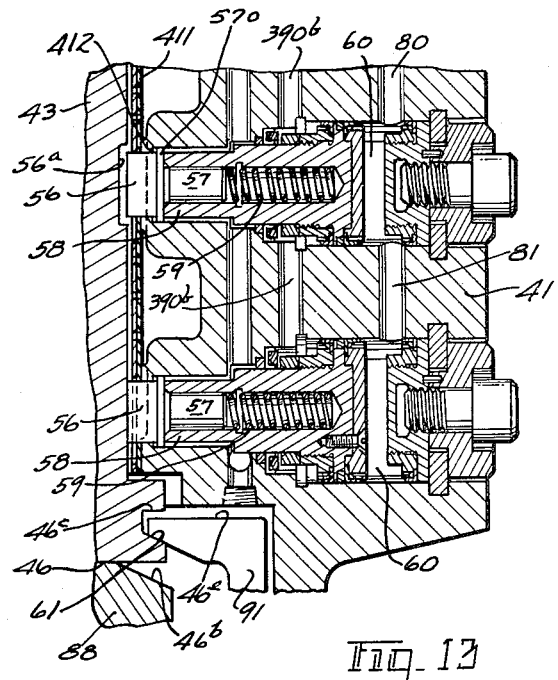
FIG. 13 is an enlarged partial section illustrating the locking mechanism for locking the parison mold inserts together.

Normally this contact between the plug 56 and the mold wall of the insert member 43 is a constant spring pressure contact; however, there are occasions when it is desirable that such contact be discontinued or eliminated and in order to do this, a clearance gap such as at notch 56a in FIG. 13 may be provided so that the plug 56 will not come into physical contact with the wall of the insert member at that particular point by reason of guide 570 on stem 57 hitting a stop at surface 412. In this way any desired amount of contact along the length of the inserts 43 and between the pressure plugs 56 and the walls of the mold insert members can be obtained and maintained.

In such an arrangement, for example, when the mold support arms 40 and 41 are open, the mold insert members 43 and 44 are held against the retaining clips 47 and 48 by the pressure generated through or from the springs 59. Thus, with the initial closing of the mold arms 40 and 41 and the initiation of contact as between the mold inserts 43 and 44, the mold members are held against each other by this spring pressure.

With the locking of the mold arms 40 and 41, fluid pressure will then be applied to the cylinders 60 and behind the pistons 58 through the admission of fluid through channels 80 and 81 formed in the mold support arm 41. This pressure in turn is transmitted through the plugs 56 to the wall of the mold insert member 43 and through the insert member 44, causing these inserts to equalize or centralize themselves between the locating plates 50 and 51, on mold arm 40, thus bringing these mold inserts on dead center and locking them in this aligned position.

It is to be understood, of course, that as the mold support arms 40 and 41 close, bringing the inserts 43 and 44 toward closed position, the mold inserts will slide up the angular surface 46b (FIGS. 2 and 13) formed on the top of the neck mold rings 88, thus raising the mold inserts 43 and 44 to their proper vertical position as they are closing about the neck rings 88. Thus, with the application of the pressure upon the mold insert plugs 56, the blank mold cavity 45 and the neck cavity of the neck forming rings or members 88 become as one continuous cavity (see FIG. 2).

Figures 2, 3:
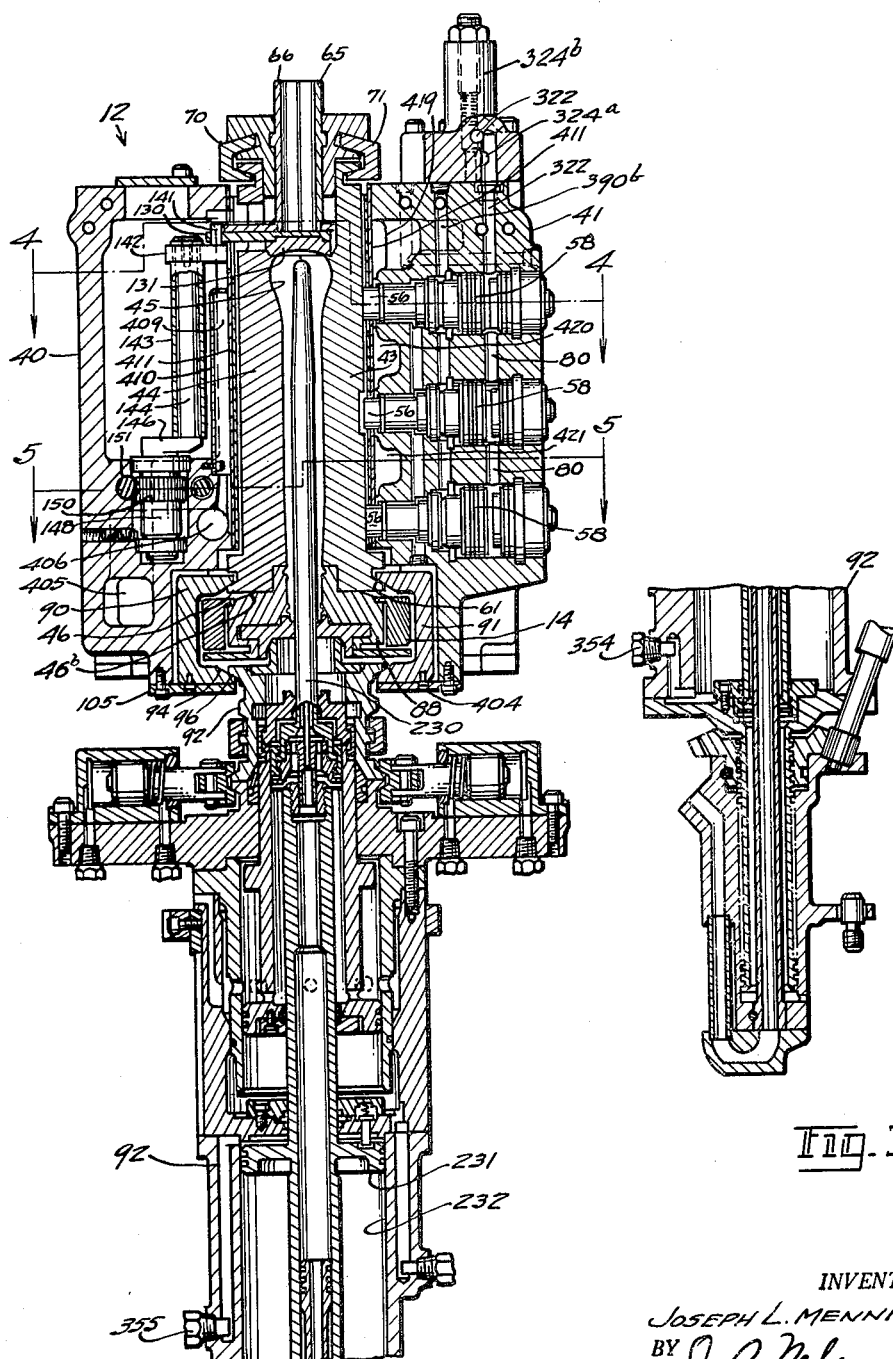
FIG. 2 is a sectional elevation through the parison forming mold unit taken at line 2—2 on FIG. 9.
FIG. 3 is a continuation of the lower end of FIG. 1 illustrating the adjusting mechanism for the pressing plunger.

In order to insure that they remain in this locked and aligned position, neck mold locking yokes of the split ring type 90 and 91 are arranged to lock the blank mold insert members 43 and 44 and the neck ring members 88 to the top end 96 of the pressing plunger cylinder 92 (see FIGS. 2 and 10). These neck ring yokes 90 and 91 are provided with opposed angular surfaces 93 and 94. The upper angular surface 93 of the neck ring yokes is adapted for contact with the angular surface 61 formed on the lower end of the blank mold insert members 43 and 44 and the lower angular surface 94 of these lock members is adapted for wedging contact with a corresponding angular surface 95 formed on the top end of member 96 of the plunger operating cylinder 92.

These neck ring yokes 90 and 91 are actuated by pistons 100 having piston rods 101 arranged for contact with the vertical side walls of the locking devices 90 and 91. Springs 102 are located behind each piston 100 and normally hold the plugs 101 in physical contact with the locking devices 90 and 91. Pins 404 in the support plate 105 run in slots 106 in the yokes 90 and 91 to limit their movement.

When the mold parts are in the position shown in FIGS. 2 and 10, pressure is applied behind the pistons 100 through the openings 103 provided in the mold support arms 40 and 41, to thereby apply pressure to the locking devices or yokes 90 and 91, thus causing the several angular surfaces of these locks, the parison mold members and the top of cylinder 92 to be brought into pressure contact, clamping the neck mold members, the parison mold members and the press cylinder 92 together under a compressive pressure and forming an integral or composite molding unit in which all of the exerted pressures are self-contained, including the pressing of the parison.

Each of the parison mold insert members 43 and 44 have their upper and lower ends turned or shaped in such manner as to provide a pressure-applying angular surface 60 and 61 respectively. Mounted to cooperate with the top of each parison mold insert members 43 and 44 are gob guide supporting members 63 and 64 which are adapted to support semi-circular mating gob guide members 65 and 66 in such manner that the gob guides are rigidly attached thereto (see FIGS. 10 and 14). Formed in these gob guide supports 63 and 64 are angular pressure surfaces 67 and 68, the angles of which are opposite to that of the pressure angle 60 formed on the top end of the mold insert members 43 and 44. Yoke members 70 and 71 are disposed opposite to each other and are provided with angular surface areas 72 and 73 adapted for sliding contact respectively with the angular surface areas 60 of the mold insert members 43 and 44.

Figures 14, 15:
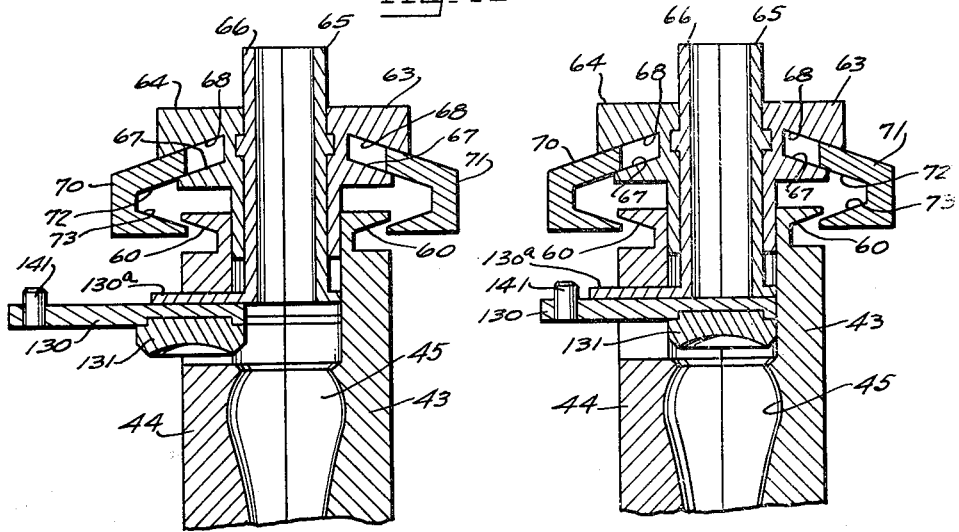
FIG. 14 is an enlarged sectional view of the mechanism for locking the gob guide and baffle to a parison mold insert showing the mechanism unlocked and the baffle removed for gob feeding.
FIG. 15 illustrates the same mechanism as in FIG. 14 with the parts still unlocked but with the baffle in position over the mold cavity.
Figure 21:
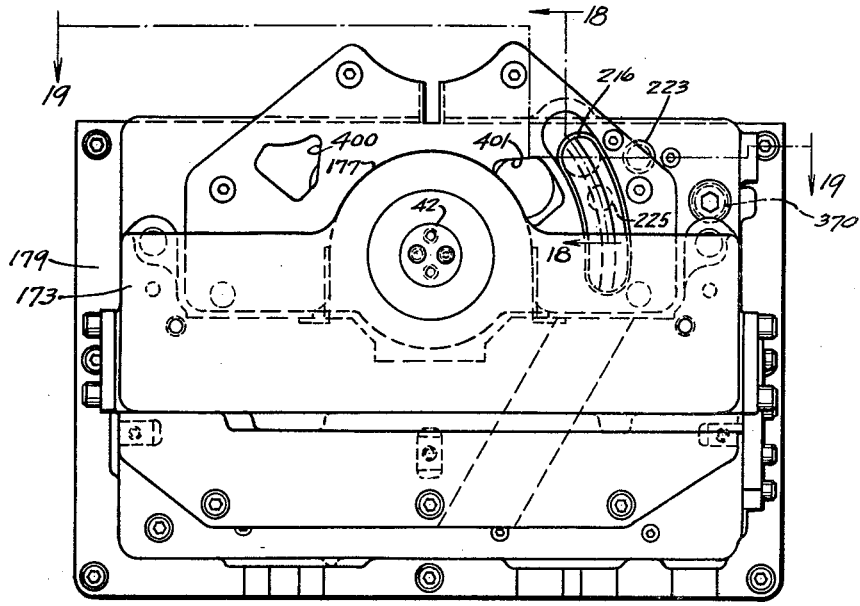
FIG. 21 is a plan view of the mold arm support bracket illustrating the location of the mold arm lock mechanism and openings for the mold arm cooling.
Figure 22:
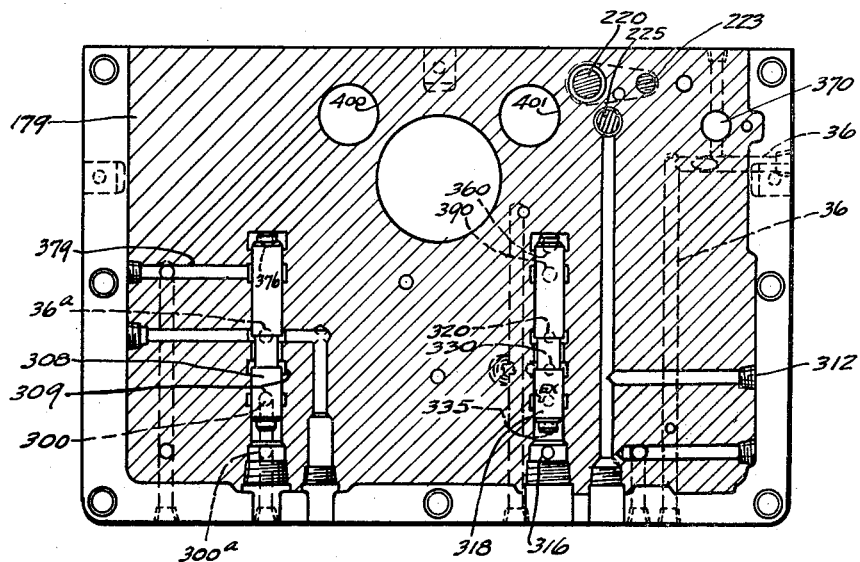
FIG. 22 is a sectional plan view taken at line 22—22 on FIG. 16 illustrating the fluid control valves for the actuation of the mold arms.
Figure 23:
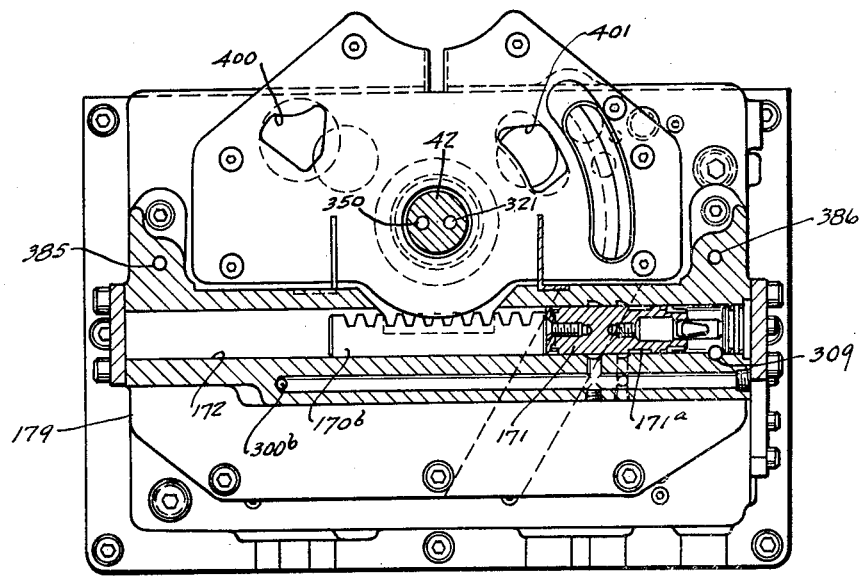
FIG. 23 is a sectional plan view taken at line 23—23 on FIG. 16 and illustrates the arrangement and structure of a mold arm actuating rack.
Figure 24:
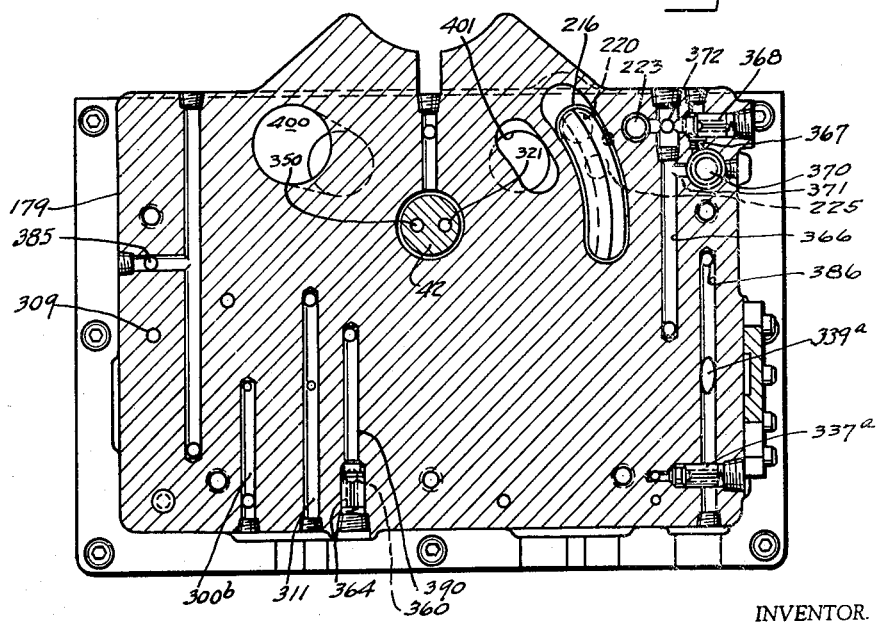
FIG. 24 is a sectional plan view taken at line 24—24 on FIG. 16 and illustrates the numerous fluid passages for actuating the mold arms and locks.

By reference to FIGS. 2, 9, 10, 14 and 15, it will be noted that when the yoke members 70 and 71 are moved toward each other the angular surfaces of these yokes will be in sliding contact with the opposed angular surfaces of the gob guide support and the parison mold inserts 43 and 44, thus causing these angular surfaces to move toward each other and to become wedgedly locked together. Contrariwise, when the yokes 70 and 71 are moved away from each other, then the guide supports 63 and 64 are moved away from the mold inserts 43 and 44 as shown in FIGS. 14 and 15. In any of these movements of the yokes 70 and 71, the said movement is always in the same horizontal plane, the result of this being that the guide supports 63 and 64 will move upwardly if the yokes are moving outwardly and conversely when the guide supports 63 and 64 are moved downwardly into locking position with the mold inserts, the yokes or locking devices 70 and 71 are moving toward each other.

The opening and closing of the parison mold supporting arms 40 and 41 is obtained through the actuation of a series of racks 170, 170a, b and c, each of these being formed on the end of a series of pistons 171 mounted in the several cylinders 172. These horizontally disposed cylinders 172 are formed in a support bracket member 173, said member being also provided with bearing support pads or extensions 177 and 178 adapted to support the fulcrum pin 42 about which the mold arms 40 and 41 open and close. In addition, these pads form a support for the mold arm hinge pin portions 40a, 40b, 41a and 41b. The support 173 is mounted upon and connected to a base member 179 which in turn is mounted upon the frame 11 of the forming machine proper. The racks 170, 170a, 170b and 170c mesh with sector gears 174, 174a, 175 and 175a formed respectively on the end of the hinge portions 40a, 40b, 41a and 41b of the arms 40 and 41 and are so arranged in mesh with the racks 170, 170a, 170b and 170c as to open and close the arms about the vertical shaft or fulcrum 42.

The mold support arms 40 and 41 are adapted to be locked together when in closed position and for this purpose one portion of a clamping device 200 is attached to the outer forward end of the mold arm 41 and a second portion 201 is attached in aligned relation with portion 200 and to the outer end of the mold arm 40. A movable locking device 202 is arranged for vertical reciprocation in a tongue and groove formation 203 and 203a formed respectively in the member 201 and 200. A retaining plate 203b retains the locking device 202 in the grooves and attached to arm 40. Interlocking fingers 204 are formed on one surface of the member 202 and adapted to lock behind fingers 205 formed on the member 200 when the parts are in the position shown in FIG. 8.

Formed on the opposite side of the member 202 is a series of gear teeth 206 adapted to mesh with a sector gear 207 attached on the horizontal shaft 208 which has bearings in and supported on the arm 40. Attached to the opposite end of the shaft 208 is a further secton gear 210, the teeth of which are arranged for meshing engagement with the teeth of a rack 211 mounted in the arm 40 and adapted for physical reciprocation therein. The lower end of this rack is provided with a finger 215 adapted to engage an elongated arcuately shaped member 216, said arcuate shaped member 216 being mounted in a depression 217 formed in the base member 179. This finger formation 215 is adapted to have permanent sliding contact with a groove 216a formed in the member 216 in order that when the mold support arm 40 is being moved to and from its closed position, an operating contact can be maintained as between the rack 211 and the arcuate member 216.

This permanent contact as between the members 216 and 211 insures that the mold locking mechanism remains either in locked or unlocked position with regard to the closed or open positions respectively of the mold arms 40 and 41. In addition, this arrangement obviates the need for any loss of time in the establishment of a contact for actuating the mold arm lock when the mold arms reach the closed position. In other words, with this mechanism and this permanent contact, when the mold arms 40 and 41 reach their closed position, the locks can be immediately actuated because of this permanently established contact as between the actuating source of power and the actuating mechanism for the lock.

With this particular mechanism it should be apparent that when the mold arms reach closed position, they can be immediately locked together by the vertical movement of the locking device 202 and when the time is reached that the mold arms should be unlocked, they can be immediately unlocked because of the permanent connection between the source of power and the lock actuating mechanism and the movable parts of the lock can be mounted in the unlocked position both during the opening and closing movements of the arm 40 thus insuring that the locking device will be in its proper position at the instant of either the closing or the beginning of the opening of the mold arms.

The arcuate member 216 provides the connecting link between the mold arm lock and the source of power for locking and unlocking this mechanism. Attached to one end of the arcuate member 216 is a shaft 220 having attached to its lower end an extending arm 221. This arm extends into a cylinder passageway 222 in which is mounted a piston 223. The function of this piston and cylinder 222 and 223 is to lower the pin or shaft 220 and with it the arcuate member 216 which would actuate the gear and rack 210 and 211 and the connecting shaft 208 in such a direction as to move the locking device 202 upwardly and thus unlock the mold arms. To lock the mold arms a piston 225 is mounted in a cylinder 226 and is adapted to have fluid pressure enter therebeneath to move this piston upwardly in contact with the lower face of the member 216, thus moving the rack 211 upwardly. The upper movement of the rack 211, of course, will rotate the sector gear 210 and the shaft 208 and transmit this motion to the sector 207 through the gear teeth 206 on the plate 202 and this locking plate will be moved downwardly, locking the mold support members 40 and 41 together.

The yokes or locking devices 70 and 71, shown in FIGS. 14 and 15, for clamping or locking the gob guides and baffle plate to the top of the mold insert members 43 and 44 are formed as a horizontal extension of a fulcrum joint 115 (see FIG. 10). By reference to FIG. 9 it will be noted that the fulcrum joints 115 are positioned intermediate each yoke 70 and 71 and on opposite sides of the radial center line of the parison mold arms and connected thereto by webs 115a. The fulcrum 115 is attached to a piston rod 116 of a fluid motor cylinder 117 having a piston 118 therein. The yokes 70 and 71 are also mounted in a slideway 120 formed on the upper top surfaces of the mold support members 40 and 41. Thus when fluid is admitted to the cylinder 117 through the openings 125, the pistons 118 are moved forward, carrying the locking yokes 70 and 71 toward each other and moving them from the position shown in FIG. 14 to the locked position illustrated in FIG. 2. In this manner the gob guide members 65 and 66 are clamped and locked to the mold insert members 43 and 44 in locked aligned position.

Figure 7:
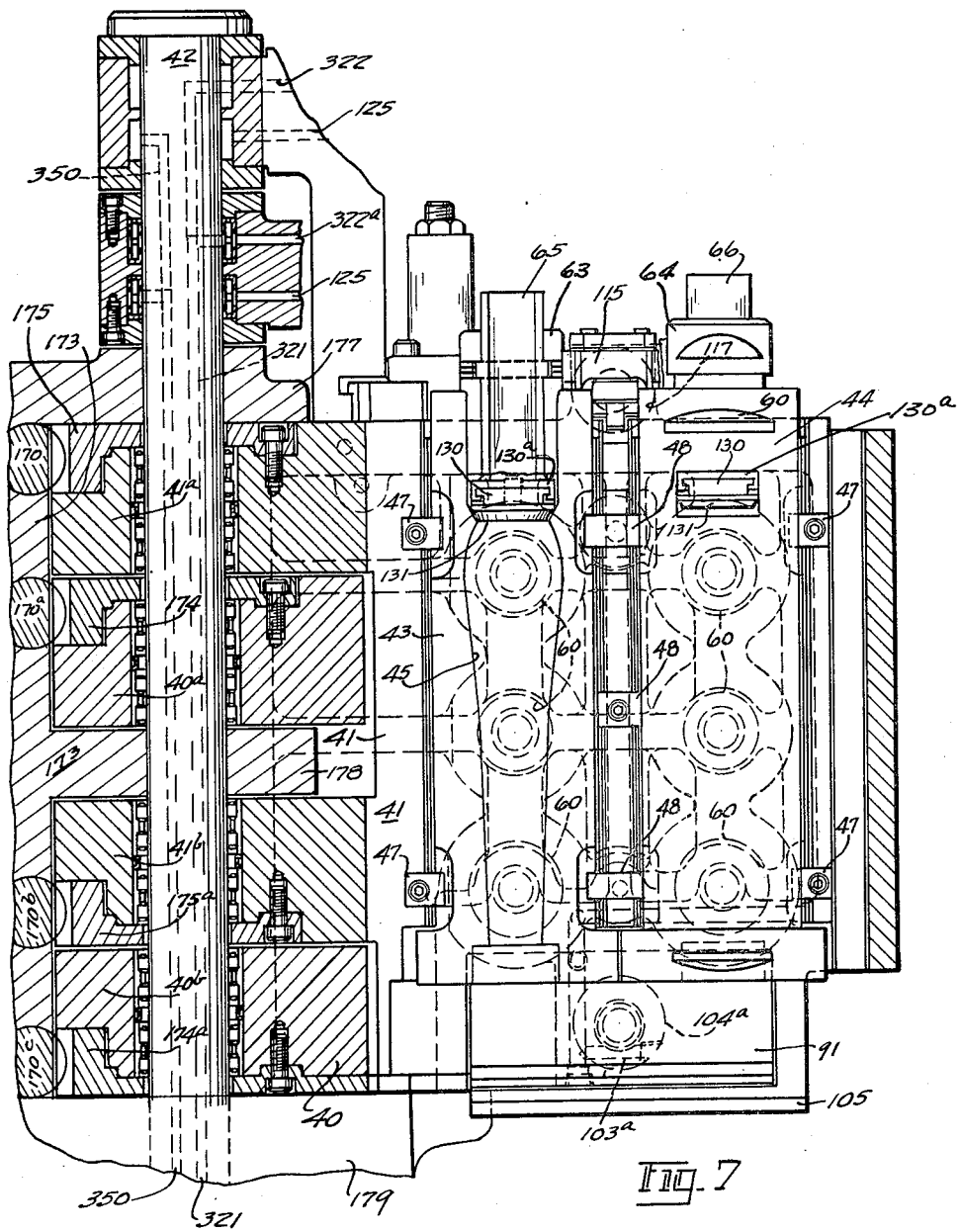
FIG. 7 is a sectional elevation taken at line 7—7 on FIG. 4 and illustrates the mounting of the mold arm and the mounting of the parison mold inserts on these mold support arms.

By reference to FIGS. 2 and 7, it will be found that a horizontally disposed slideway 130a is formed on the lower end of the gob guide portion 66 and therefore it must necessarily move vertically with the gob guide 66 when the same is raised and lowered with respect to the mold inserts 43 and 44.

While the gob guides and the locking yokes 70 and 71 are in the position shown in FIG. 14, the baffle plate 130, which is mounted in the slideway 130a, and its baffle 131 will be actuated, moving these parts to the position shown in FIG. 15. Thus when the yokes or locking devices 70 and 71 are actuated to lock the gob guide members to the mold insert members, the baffle 131 will already be positioned in alignment with the cavity 45 and as the locking action takes place, the baffle 131 will be moved down into position to seal the cavity 45 as shown in FIG. 2.

The actuating mecahnism for moving the baffle 131 into and out of operative and inoperative positions is obtained by a series of eccentric lever actions.

Figure 4:
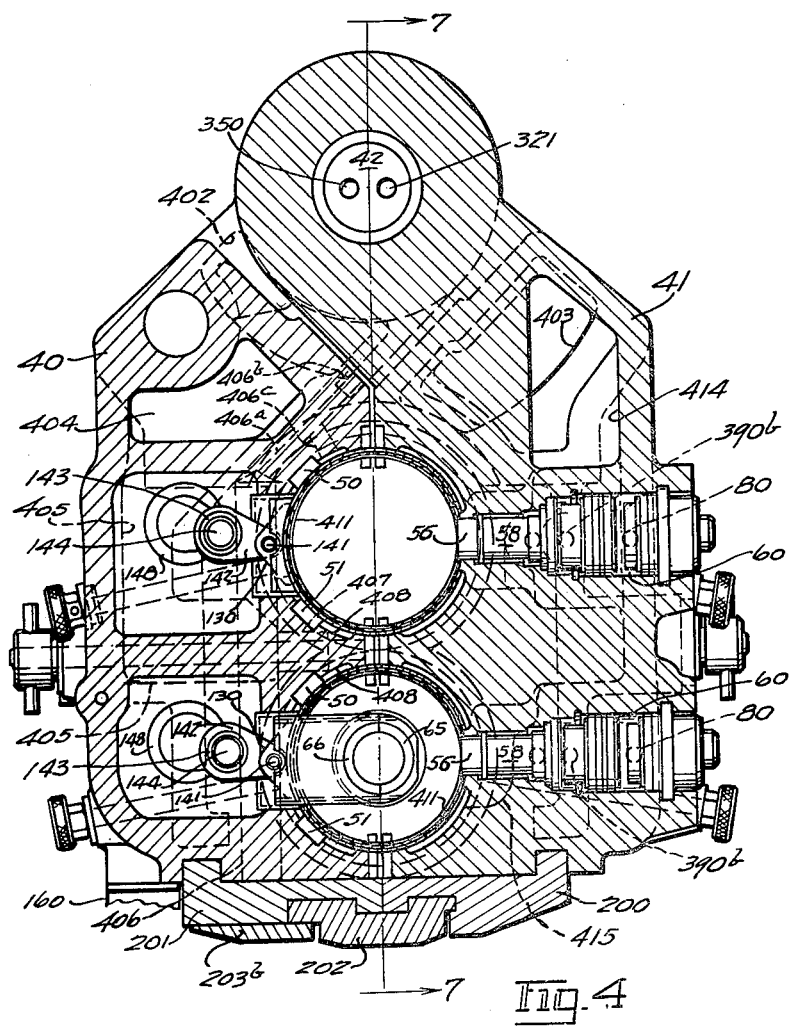
FIG. 4 is a sectional plan view, taken at line 4—4 on FIG. 2, illustrating the mold insert locking mechanism and the gob guide actuating mechanism.

Referring to FIG. 4, the baffle plates or members 130 are provided with a fulcrum pin 141 mounted at its outer end to which is attached a lever 142 formed as the top part of a vertical tubular shaft 143. This tubular shaft 143 is arranged to freely rotate on the vertical shaft 144 and in addition maintains the proper spacing as between the upper lever 142 and the lower lever 146 (FIG. 2). The shaft 144 is formed as a part of the lever 146 extends verticallly upward therefrom. In addition, the lever 146 is also formed as a part of the bearing member 148 which is arranged for rotary oscillation about its vertical axis.

Gear teeth 150 are formed on a portion of the outer surface of member 148 and a horizontal rack member 151 is positioned for running contact therewith. The rack 151 is mounted in the mold support member 40 and arranged for piston reciprocation in a horizontal plane (FIG. 5), to move baffle plate 130 and the baffle member 131 into and out of opening position, through movement of levers 142 and 146 about the vertical axis of shafts 144 and 148, respectively. The baffle plates 130 are so interconnected to the rack 151 that they may be operated in unison, i.e., they will be simultaneously swung into and out of position over the cavity 45. Likewise the vertical movements of the baffle members 131 are in unison and controlled and actuated by the movement of the locks 70 and 71.

The actuation of the baffle operating rack 151 is obtained through a cylinder 155 formed in the arm 40 and has its piston 156 attached to the position and the rack by a rod 157. Fluid pressure for actuating piston 156 is supplied through pressure line 149. The opposite end of rod 157 is attached, as at 158, to an end of the rack 151.

A valve 160 having a valve stem 161 is provided at the outer end of the mold arm 40 and arranged in alignment with the rack 151. The stem 161 of valve 160 is arranged for contact with the end of the rack at the end of its baffle positioning stroke. This valve stem 161 will then be shifted by the rack 151, against a spring 162 to permit fluid under pressure to pass through the valve 160 to the pipe 125 and thence to cylinders 117 (FIGS. 8 and 10), thereby moving the yokes or locking devices 70 and 71 to lock the gob guide members 65, 66 and the baffle members 131 into cooperating position with the pairs of mold insert members 43 and 44. The removal of the baffle members 131 from cooperation with the parison mold members 43 and 44 is obtained by supplying pressure fluid through pipe 165 (FIGS. 5 and 27), through passages 166 and 167 to an opening before piston 156. However, this removal of the baffle members 131 must be obtained subsequent to the unlocking of the baffle members and the gob guide members 65 and 66.

The fluid operation of this parison molding unit 12 and the sequence thereof is set forth in the following paragraphs. In order to properly understand this operation it is necessary to assume that the parison mold support members 40 and 41 are in open position and that a parison forming cycle is about to begin which requires that the arms be closed.

Figure 5:
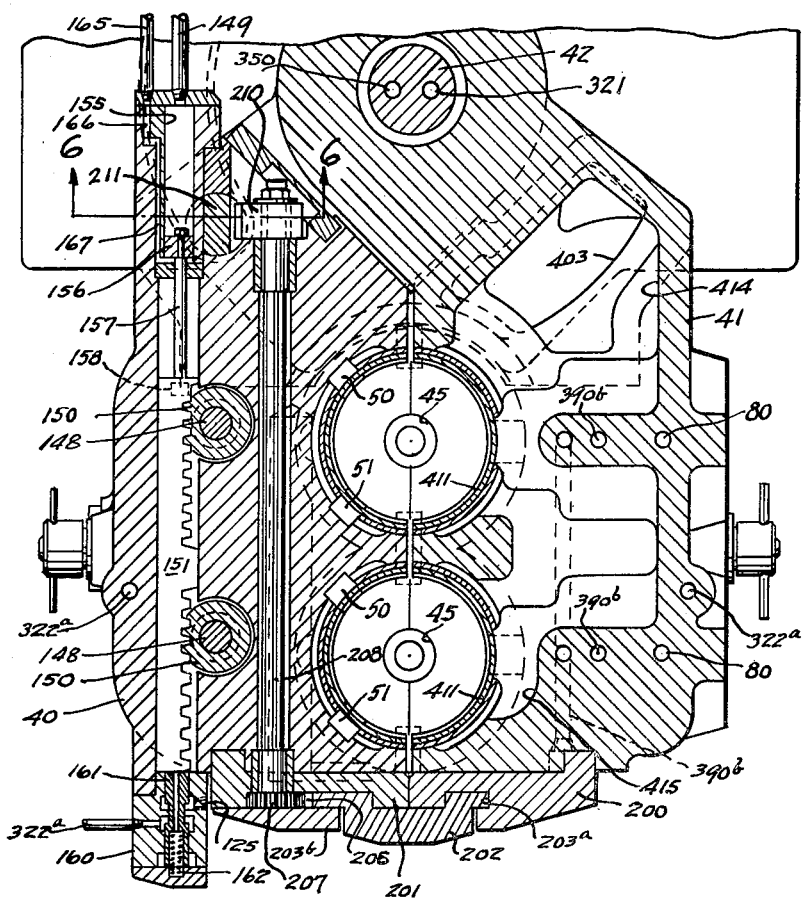
FIG. 5 is a sectional plan view taken at line 5—5 on FIG. 2 illustrating the locking members for the mold support arms and the actuating mechanism for this lock.
Figure 6:
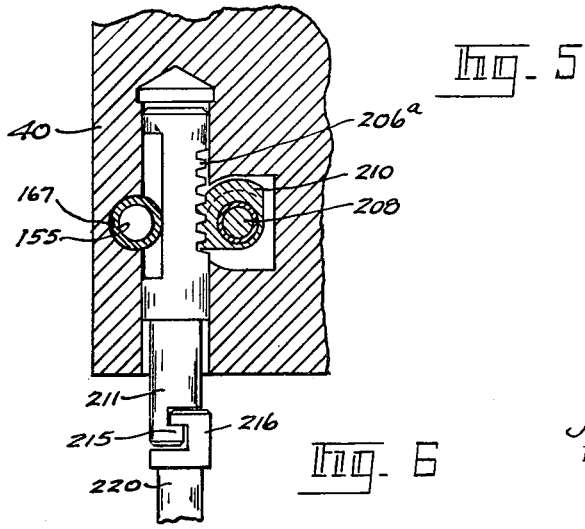
FIG. 6 is a partial section taken at line 6—6 on FIG. 5 illustrating the mold arm lock actuating device.

The cam drum 26 through one of the actuating knobs 28–30, trips one of the valves 35 permitting pressure from main line 36 to pressurize line 300 and to exhaust the line 360 (FIG. 28). The pressure to line 300 and 300a will shift the control valve 308, permitting fluid under pressure from supply line 36a to pass through line 309 to the ends of the mold arm cylinders 172. This applies pressure to the ends of the pistons 171, moving the racks 170–170c, which are in contact with the gear sectors 174, 174a, 175 and 175a, and rotates the mold support members 40 and 41 about fulcrum 42 to the closed position as illustrated in FIGS. 5 and 16.

As the mold support members reach closed position, they are to be immediately locked to each other. A safety arrangement is provided so that the mold arm lock device 202 may not be actuated until both support members 40 and 41 are fully closed. For example, lines 310 and 311 (FIG. 28) interconnect the ends of cylinders 172 and these two lines are arranged for cooperation with the cut-out portions 171a in the ends of the pistons 171. Assuming that arm 40 first reaches fully closed position, with the parts in the position shown in FIG. 16, pressure from supply line 300b cannot flow to the mold arm lock mechanism because arm 41 is still open, thus blocking the passage of fluid from line 300b to line 311. Consequently, line 312 will not be pressurized until such time as the piston of the arm 41 reaches its full closed position. Then fluid can flow from line 300b through line 311 to line 312 to actuate the mechanisms which move the mold support member lock device 202 to locking position.

This movement of pistons 171 permits fluid pressure to pass through the end portion of piston 171, as at 171a, through lines 311 and 312 to the bottom of cylinder 226 and beneath piston 225, thus raising the mold arm lock contact member 216. Through the connections previously described herein, this raising of member 216 actuates rack 211, shaft 208 and eventually the mold arm locking device or plate 202 to lock mold arms 40 and 41 together. At the end of the up-stroke of piston 225, oil will pass through the groove 315 into line 316 to one end of the valve 317, shifting the valve stem 318 and permitting fluid under high pressure (3,000 lbs.) to pass from line 320 through lines 321, rotary joint 323 to line 322. A check valve 324 prevents free flow of the pressure in line 322 and causes the pressure to by-pass to line 324a and pressure check valve 324b. This pressure check valve 324b permits the clamps 90 and 91 to close while sufficient pressure builds up in port of valve 324b to open same, passing the fluid to channel 80, to the cylinders 60 and behind pistons 58 to move the lock pads 56 into contact with the mold insert members 43 to clamp and lock same against the corresponding insert member 44 and the insert centering blocks 50 and 51.

With the shifting of valve 318, as mentioned above, fluid pressure from line 316 will then flow through line 335, orifice 336, check valves 337 and 337a to the mold opening equalizing cylinders 339 and 339a, moving the pistons 341 and 341a back to a point where ports 342 and 342a are opened to drain. This permits the full effect of the closing pressure upon the pistons 171 from the pressure line 309.

Simultaneous with the flow of pressure through lines 322 and 322a, this pressure also enters lines 340 and 340a, leading to channels 103 and 103a in arms 40 and 41 (see FIG. 10), thereby providing pressure into the cylinders 104 and 104a and behind pistons 100 to move the yokes or locking devices 90 and 91 to clamping or locking position. Thus the bottoms of the mold insert members 43, 44 and the neck mold members 88 are clamped to the top flange 96 of the plunger cylinder 92. The line 322a also brings fluid pressure to the valve 160 which is on the mold arm 40 and which controls the locking yokes 70 and 71 for locking the baffles 131 to the mold inserts.

At the same time that fluid pressure flows through line 321 to the mold insert locks or clamps 56 as mentioned above, pressure also flows through line 330 to the time delay valve 331. During the period of delayed action provided by the delay valve 331, the parison molds receive a charge of molten glass preparatory to forming a parison in the cavities 45. This valve 331 with its delayed action has fluid pressure piped thereto through pressure line 332 and finally permits this pressure to flow through line 149 to the back end of the baffle positioning cylinder 155 (FIGS. 5 and 27) to shift the rack 151 and slide the baffle members 131 laterally into position for closing the top opening of the mold cavities 45 (FIGS. 2, 4, 7, 14 and 15).

As the rack 151 reaches the end of its stroke, it actuates valve 161, permitting pressure to flow from line 322a to line 125, thence to the back of the cylinders 117, moving the yokes or locking devices 70 and 71 to move the baffles 131 down or in an axial direction onto the top of the molds 43 and 44 and at the same time lock them to the mold inserts in glass pressing position.

The pressure from line 125 finally passes through rotary joint 349 to the line 350 to the end of cylinder 351, shifting the valve 352 and permitting fluid pressure from supply line 353 to pass to the bottom of plunger cylinder 92 through the line 354 while exhausting the top of the cylinder through line 355. This moves the plunger 230 upward into the mold cavity 45 pressing a parison to shape. With the completion of the pressing operation, the cam drum 26 will pressurize lines 360 and 361. The pressure through line 361 will actuate valve 352 to shift and supply pressure through line 355 and retract plunger 230.

At the same time that line 300 is placed on exhaust, the pressure in line 309 is maintained from pressure line 36a. The pressure through line 360 is checked by check valves 363 and 364, which will then shift valve 318 so that lines 125 to the baffle clamps 70 and 71, line 322 to the mold clamps 56, and the line 330 to the delay valve 331 will go to exhaust.

As these lines 125, 322 and 300 go to exhaust, pressure from line 320 enters through the valve 318 to lines 390, 390a, 390b and 390c, applying pressure in front of the pistons 118 and 58 to move the baffle locking devices 70, 71 and insert locks 56 out of locking position. The fluid pressure in line 390 also passes through valve 391 to cylinder 117 to move the yoke 71 out of baffle locking position and as the yoke 71 moves back it contacts the valve stem 392, shifting same so that the pressure from line 390 passes through line 394 to line 165 and then to cylinder 155 to move piston 156 and rack 151. This rack movement moves the baffle members 131 out of alignment with the mold cavities 45.

As valve 318 reaches the end of its stroke, fluid from line 360 passes through line 366, speed control orifice 367, but is stopped by check valve 368 and the pressure check 370 in line 371. When the baffle members 131 are up, pressure will build up in lines 360, 366 and 371 and force the pressure check 370 to open and allow fluid to pass through line 372 to the piston 223 to unlock the parison mold support member lock 202. At the end of the stroke of piston 223, the fluid passes through groove 375 from line 372 and enters line 376 to shift valve 308, permitting line 309 to exhaust through line 300.

As valve 308 reaches the end of its stroke, the pressure from line 376 passes through groove 378 and line 379 to the cylinder 380 and behind piston 381, thus moving piston 381 which in turn contacts and moves pistons 341 and 341a. The movement of pistons 341 and 341a causes an equal displacement of oil through lines 385 and 386 to the ends of the pistons 171a, causing them to move simultaneously, thus causing each mold support member 40 and 41 to start to open simultaneously. With the completion of the opening motion of the mold support members 40 and 41, the transfer arm 14 swings about fulcrum 14a to transfer the shaped parisons to the blow mold 16. The parison is there released and the transfer arm 14 and neck mold 88 return to a position below the parison molds 43 and 44 and await the initiation of the next forming cycle by the cam drum 26.

In the foregoing manner a complete fluid operated cycle has been completed and the shaped parison has been transferred to the blow mold 16 by the transfer arm 14. Provision for cooling the molds 43 and 44 is provided in each mold arm 40 and 41. The cooling medium is supplied from some source (not shown) and is carried through the base member 179 in passageways 400 and 401 which are in constant communication with openings 402 and 403 in the bottom face of mold support members 40 and 41 respectively (see FIG. 4). The opening 402 matches with opening 400 in the base 179 and leads upwardly in the mold arm 40 to interconnect into the passageways 404, 405, 406, 407 and 408 and supplies cooling air to the chamber 409 behind plate 410 and around the perforate cooling sleeves 411. Leading from the inner end of the channel 406 is a further channel 406a plugged as at 406b and having an opening 406c leading the air into contact with the perforate sleeve 411 (FIG. 4). In the mold support member 41 the opening 403 matches with the opening 401 in the base 179 and leads upwardly into the passage 414 which extends through the full height of the arm. The passageways 415, 416 and 417 (FIG. 10) lead horizontally from 414 and have openings 419, 420 and 421 arranged to supply cooling air to the perforate cooling sleeve 411. In this manner the mold insert members 43 and 44 may be maintained at operating temperature.

Figure 8:
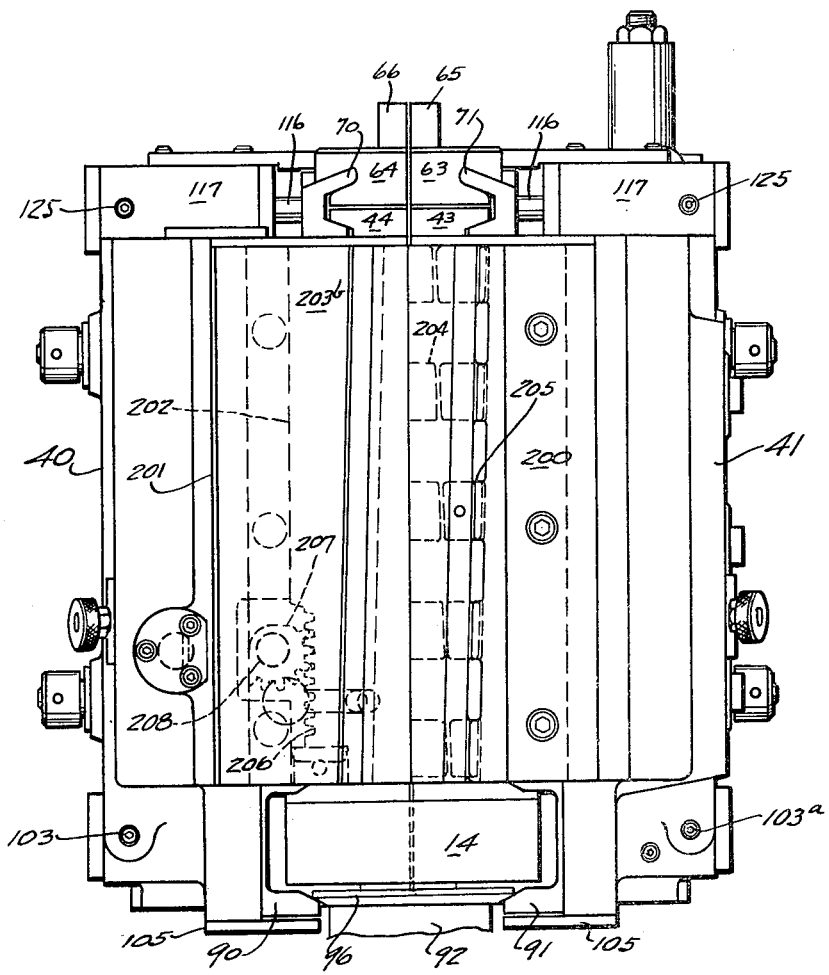
FIG. 8 is an elevational view of the mold support arm lock taken at the arrow "A" on FIG. 4.
Figure 9:
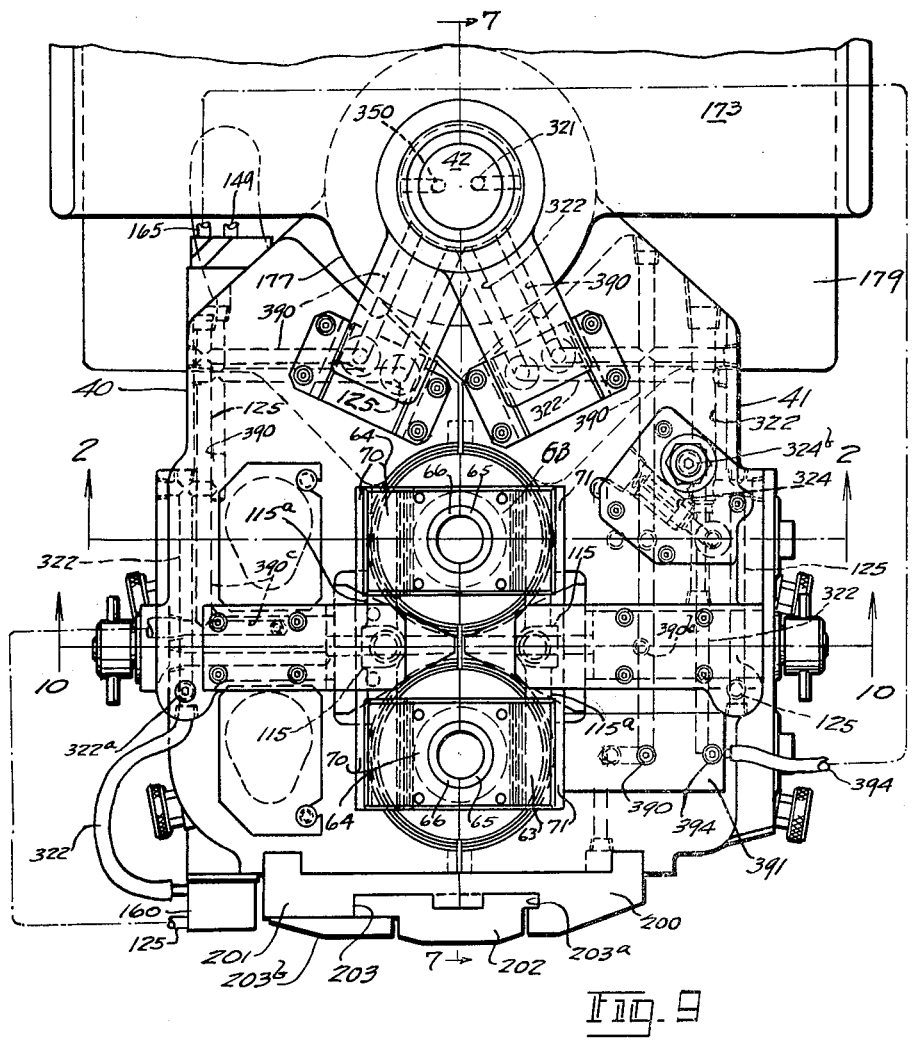
FIG. 9 is a plan view of the mold support arms and illustrating the gob guide mounting and actuating cylinders as well as illustrating the mold arm lock.

In the operation of this glass forming machine there is, of course, a certain preferred form of cycle and this cycle should be approximately as follows:

The cycle of the mechanical operation of this blank or parison molding unit normally starts with the mold support members 40 and 41 in open position and therefore requires that first the support members be closed through the actuation of the series of racks 170–170c in conjunction with the sector gears 174, 174a, 175 and 175a. This brings the mold support members to closed position such as shown in FIGS. 5, 8 and 9. At this time fluid will be admitted beneath the piston 225 to move the member 216 upwardly and through the rack 211, gears 207 and 210 and the shaft 208 will move the locking plate 202 into locking position with the fingers 205 attached to the mold support member 41. Just prior to the time that the baffle 131 is being locked or concurrently therewith, the lower yoke or locking members 90 and 91 are moved toward each other, locking the blank mold members and neck mold members 88 to the top member 96 of the press plunger cylinder 92. Immediately upon the locking of the blank mold support members 40 and 41, fluid is permitted to enter behind the pistons 58 in cylinders 60 formed in mold support member 41, moving the lock plugs or devices 56 into physical contact with the mold inserts 43, forcing these mold inserts into locked physical contact with their opposing mold halves 44, thus locking the mold insert members in cavity forming position and about the neck mold halves 88.

At this point a gob of molten glass is discharged into the cavity 45 formed between the locked mold insert members 43 and 44. A time delay is provided in the cycle at this point by the time delay valve 331 to permit the mold to be charged. Immediately upon this charge entering the mold cavity, fluid is permitted to enter through pipe 149 into cylinder 155 and behind piston 156, moving the rack 151 in its horizontal path, thereby rotating the gears 150 about the vertical axes of the shafts 148. This movement will cause the vertical shaft 144 to swing about the same axis and at the same time to move the arm 142 about the vertical axis of the shaft 144, causing the baffle plate 130 and the baffle member 131 to move inwardly into position over and in alignment with the parison cavity 45. Immediately upon the baffle member reaching this alignment position, fluid enters through line 125 behind the pistons 118 of the cylinders 117 mounted on each of the mold support members 40 and 41, thus moving the clamp or locking yokes 70 and 71 toward each other, thereby moving the gob guide members 65 and 66 downwardly, carrying the baffle member 131 into closing position on top of the cavity 45 and at the same time locking this baffle member to the top of the mold through these yokes or locking devices as illustrated in FIG. 2.

These closed mold insert members are locked to each other at both ends and the molds and their supporting units or members are locked to the top end of the cylinder 92, and thus become an integral or composite unit so that when the pressing plunger 230 is moved upwardly into glass pressing position by the piston 231 of the cylinder 232, the force thus applied to the molten glass to disperse it in the cavity 45 becomes a self-contained force and is thus prevented from adversely displacing any of the molds in any direction.

The continued actuation of these mechanisms requires that the plunger 230 then be withdrawn from the glass. The baffle members 131 are raised by the unlocking of the yokes 70 and 71 and moved out of alignment with the cavity 45. The yokes or locking devices 90 and 91 are moved to releasing position, thus freeing the mold unit from its clamped or locked position on the press plunger cylinder 92. The mold support members 40 and 41 are unlocked through movement of lock device 202 and then the various racks 170–170c are actuated, opening the mold support members and the parison mold members 43 and 44 away from the pressed parison.

With this opening of the parison mold members, the neck ring supporting arm 14, carrying the neck mold members 88 and the pressed parison, will be rotated about the fulcrum 14a (see FIG. 1) swinging the parison upwardly and thence downwardly to a position in register with the blow molds 16. The blow molds are then closed about the parison, the neck mold members 88 will be opened, releasing the parison to the blow mold. Thereafter the neck mold carrying arm 14 will again swing about the fulcrum 14a, moving back to a position where the neck mold members are beneath and in alignment with the parison mold members 43 and 44 as shown in FIG. 2 and preparatory to starting a new cycle. The actuation of all these various mechanisms and carrying out of this cycle is in this particular instance a fluid and controlled operation.

Variations may be resorted to within the spirit and scope of the appended claims.

I claim:

1. Apparatus for shaping molten glass comprising complementary split neck mold members, parison mold support arms mounted for mold opening and closing movements, complementary split parison mold members mounted on said parison support arms and closable on said neck mold members to define a hollow open-ended parison cavity, a cavity closing baffle, a support means for said neck mold members mounted for neck mold opening and closing movements, means connected to said baffle for sequentially moving the latter laterally into axial registry and axially of said cavity to close the end opening, means for locking the baffle onto the closed split parison mold members, a pressing plunger actuator means including a cylinder member, a pressing plunger connected to said actuator means and reciprocally movable thereby axially into and out of said neck mold end opening of the parison cavity, a locking device mounted on and movable with said mold support arms and engageable with the closed split parison mold members, means for actuating said locking device engaging and locking said parison mold members closed, a separate locking device mounted on and movable with said mold support arms and engageable with the closed parison mold members and said cylinder member, means for actuating said separate locking device, and means for operating said pressing plunger actuator means for inserting the plunger into pressing relationship in said parison cavity after the parison mold, neck mold, and cylinder member are locked together as a composite unit with said mold support arms, thereby shaping glass in said cavity.

2. A parison forming unit comprising a parison mold support, a parison mold mounted upon said support and having limited movement thereon, said parison mold having a parison shaping cavity formed therein, a cavity closing baffle, a neck forming mold positioned at the opposite end of said parison mold and arranged to complete the paison shaping cavity, a glass pressing device mounted separate from said mold support and including a reciprocable pressing plunger and pressing plunger actuator means, said plunger being movable by said actuator means into and out of said cavity, a baffle locking device, means for engaging said baffle and operable to lock it in cavity closing position on the open upper end of said parison mold, a locking means mounted on said mold support enagageable with the parison mold and said pressing plunger actuator means for locking said neck mold and pressing plunger actuator means onto the lower end of said parison mold, said locking device when locked connecting the parison mold, neck mold and pressing plunger actuator means together as an integral parison forming unit, and means on said mold support connected to said locking device for operating it.

3. A glass forming unit for shaping molten glass into formed glass articles comprising a movable parison mold support means, a partible parison mold comprised of complementary mold section members mounted on said support means and defining an open-ended glass shaping cavity, a mold cavity closing baffle member, a neck mold member, a glass pressing device including a plunger, cylinder member and guide for said plunger, the plunger being axially shiftable with respect to the axis of said glass shaping cavity, all of said members being arranged to cooperate in forming glass articles, locking devices carried on and movable with said mold support means and movable to lock all said members into a composite unit, separate means connected to each of said members to move them into their cooperable glass shaping position with respect to each other, means connected indvidually to said locking devices actuating them to lock said cooperable members together into said composite unit, and a pressure fluid operated means in said cylinder connected to said plunger to actuate the plunger axially in its said guide and within and centrally of the shaping cavity of said locked mold members, and control means connected to said actuating means for said members, and to said locking device actuating means and the plunger for operating them for shaping glass to an article.

4. Apparatus for molding molten glass, comprising mold support members mounted for movement toward and away from each other, complementary split parison mold members mounted on said support members and movable to a closed relationship to define a glass shaping cavity having opposite end openings, a gob guide member, means for mounting said gob guide member for movement relative to said parison mold members, a mold cavity closing baffle member, means connected to said baffle member for moving the latter into and out of position for closing one end opening of said glass shaping cavity, split neck mold members, independent support means for said neck mold members mounted for movement for opening and closing said neck mold members, individual locking devices for each of said members mounted on and movable with all said members being movable to a glass shaping relationship for forming a glass parison, means to actuate said locking devices to lock said members in said glass parison shaping relationship, whereupon said members are locked together and movable only as a composite unit, means for applying a glass shaping pressure through the neck mold, and means for moving said pressure appling means into an operative connection with said neck mold to move molten glass within said composite unit and shape a glass parison therein.

5. In apparatus for shaping molten glass having a partible neck mold mounted for opening and closing movement, a pair of mold arms mounted for opening and closing movements and supporting thereon complementary mold halves closable on the closed neck mold defining an open-ended molding cavity, a pressing plunger, a plunger cylinder registerable with said neck mold, a cavity closing baffle, means connected to said baffle for moving it into and out of closing position over the open end of said cavity opposite the neck mold, and controlled power supplying means connected to said plunger cylinder and plunger for reciprocally moving the latter axially of said cylinder, the improvement therein comprising a first locking means mounted on said mold arms and engageable for locking them in closed position, pressure applying means mounted on at least one of said mold arms engaging the mold half thereon for applying pressure to hold the mold halves tightly closed, a second locking means mounted on said mold arms and engageable with said mold halves and said plunger cylinder for locking said mold halves and the neck mold to the plunger cylinder, a third locking means connected to said baffle operable for seating and locking the baffle onto the closed mold halves, and independent actuating means mounted on the mold arms connected to operate each of said first, second and third locking means and said pressure apply means, whereby all the locking forces are connected to the mold arms and the mold halves, neck mold, mold arms, baffle and plunger cylinder are integrally locked against movement with respect to each other.

6. A parison forming apparatus comprising a hinged pair of parison mold supporting arms arranged for opening and closing movements about a common fulcrum, a plurality of pairs of mating halves of parison cavity inserts freely mounted on each of said arms and arranged when closed to form vertically disposed parison shaping cavities open at both ends, a wedge-type locking device mounted upon said arms and arranged to lock said parison mold arms together when in closed position, said locked mold arms arranged for limited motion as a unit about their common hinged fulcrum, a plurality of sets of pressure applying devices carried by one of said mold arms and arranged to apply closing pressure to each pair of said mating halves to lock said halves in closed parison forming relationship, neck forming molds, each having a cavity arranged to cooperate with and be locked in alignment with one end of each cavity formed by each said pair of closed mating parison inserts, a cavity closing baffle arranged to be locked to the opposite end of each said pair of closed parison inserts, said parison molds, and baffles being carried on and movable with said mold arms, a locking device supported by said mold arms to lock said baffle to said closed parison inserts, a plurality of glass pressing plunger mechanisms including a cylinder housing and a pair of movable pressing plungers supported beneath and independently of said mold arms, said plungers being aligned for cooperation with each of said parison cavities, a locking device connected with said cylinder housing to lock said cylinder housing to said parison molds, separate means for actuating said mold arm lock, means to actuate each set of locking devices for each pair of said parison cavity inserts, means connected to said baffle locking device for actuating same, and separate means to actuate said cylinder housing locking device, the several said locking device actuating means being mounted upon and carried by said parison mold arms.

7. A parison forming unit comprising a parison mold support, a parison mold mounted upon said support and having limited movement thereon, said parison mold having a parison shaping cavity formed therein, a cavity closing baffle carried on said support above said parison mold cavity, a neck forming mold positioned at the opposite end of said parison mold and arranged to complete the parison shaping cavity, a glass pressing device mounted separate from said mold support and including a reciprocable pressing plunger, said plunger being movable in axial relationship to cooperate with the parison molding cavity formed by said neck and parison mold by movement into and out of said cavity, a device connected to said baffle and operable for locking it to the open upper end of said parison mold in cavity closing position, a locking device adapted to lock said neck mold and pressing device respectively to the lower end of said parison mold, said several locking devices mounted upon said mold support and adapted when in locked position to form an integral parison forming unit, and controlled lock actuating means connected to each of the several locking devices for actuating them in predetermined sequence.

8. Apparatus for forming glass articles comprising a pair of parison mold supporting arms mounted for opening and closing movements about a fulcrum, mating halves of parison cavity inserts freely mounted on each of said arms and adapted when closed to form a parison shaping cavity open at both ends, a wedge-type locking device arranged to lock said parison mold arms together when in closed position, said locked mold arms arranged for limited motion about their fulcrum, pressure applying devices carried by one of said arms and arranged to apply closing pressure to at least one of said mating mold halves to lock said mold halves in closed parison forming relationship, a neck forming mold arranged to cooperate with and be locked in alignment with one open end of the cavity formed by said closed mating halves, a glass pressing plunger, means for guiding the plunger and arranged for aligning cooperation with said parison cavity, a locking device for locking said neck mold and said plunger guide means to said parison inserts thereby locking said neck mold, parison cavity and plunger in aligned relationship, a cavity closing baffle, a locking device arranged to lock said baffle to the opposite end of said mold halves, said neck mold and baffle locking devices being supported on and movable with said mold arms, separate means for actuating said mold arm locking device, means to actuate the locking device for said parison cavity halves, means individual to said baffle locking device for actuating same, and means to actuate said neck mold locking device, the several said actuating means mounted upon and carried by said parison mold arms.

9. Apparatus for forming hollow glass parisons comprising a cylinder-piston motor, a glass shaping element connected to said cylinder-piston motor for axial reciprocating movement thereby, a neck mold, a movable support for said mold for bringing it into an aligned glass forming relation with said glass shaping element, a partible blank mold defining a parison shaping cavity open at its opposite axial ends, movable blank mold supporting arms for bringing it into an aligned glass forming relation with said shaping element and said neck mold, a locking means mounted on and movable with said blank mold supporting arms and operable to lock said partible blank mold closed, a locking means mounted on and movable with said blank mold supporting arms and operable to engage said blank mold and the cylinder of said motor and lock said blank mold and neck mold to said cylinder-piston motor, a baffle engageable on the opposite end opening of the blank mold and enclosing a charge of molten glass for further shaping in said parison cavity, the said locking means, neck mold, blank mold, blank mold supporting arms, and said cylinder of the motor being collectively locked together as a unit, and a fluid pressure supplying means connected to said cylinder-piston motor for operating said shaping tool with respect to said locked unit and form the enclosed charge of molten glass into a hollow glass article.

10. In a parison mold assembly wherein a pair of hingedly supported arms each carrying a complementary parison mold section are closable to define a hollow, open-ended mold cavity, a gob guide surmounting the cavity and registrable with the one end opening of said mold cavity and a plunger axially insertable into the other end opening of said cavity, comprising a cavity closing baffle, means on the end of said gob guide adjacent the mold opening and engaging said baffle for guiding movement of the baffle by said gob guide radially thereof and into axial alignment with said one end opening of said cavity, means connected to the baffle for radially moving it into and out of registration with said one end opening of said mold cavity, and locking means for moving said gob guide and said baffle axially to secure the gob guide to said mold sections with the baffle interposed therebetween to close said one end opening of the cavity.

11. The parison mold assembly defined by claim 10, wherein the gob guide comprises a pair of semi-circular mating tubular members each shiftably mounted on said one end of said complementary parison mold sections and movable axially with respect to said cavity, and said locking means comprising yoke members engaging the gob guide members and the parison mold sections axially moving the gob guide toward the mold and locking the latter two together with said baffle interposed therebetween in locked cavity closing position.

References Cited by the Examiner
UNITED STATES PATENTS

| | | | |
|---|---|---|---|
| 438,893 | 10/90 | Lomax | 65—370 |
| 1,350,375 | 8/20 | Miller | 65—323 X |
| 1,836,646 | 12/31 | Crile | 65—323 |
| 2,049,422 | 8/36 | Bridges | 65—64 |
| 2,282,449 | 5/42 | Bert | 65—223 |
| 2,508,890 | 5/50 | Rowe | 65—229 |
| 2,508,891 | 5/50 | Rowe | 65—229 |
| 2,702,444 | 2/55 | Rowe | 65—167 |

DONALL H. SYLVESTER, *Primary Examiner.*